(12) United States Patent
Wu

(10) Patent No.: US 12,004,035 B2
(45) Date of Patent: Jun. 4, 2024

(54) PROVIDING SUPPORT TO PACKET-DATA VOICE AND VIDEO CALLS

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 154 days.

(21) Appl. No.: 17/293,459

(22) PCT Filed: Nov. 6, 2019

(86) PCT No.: PCT/US2019/060088
§ 371 (c)(1),
(2) Date: May 12, 2021

(87) PCT Pub. No.: WO2020/097215
PCT Pub. Date: May 14, 2020

(65) Prior Publication Data
US 2022/0086721 A1    Mar. 17, 2022

Related U.S. Application Data

(60) Provisional application No. 62/770,546, filed on Nov. 21, 2018, provisional application No. 62/757,149, filed on Nov. 7, 2018.

(51) Int. Cl.
*H04W 36/14* (2009.01)
*H04W 8/22* (2009.01)
*H04W 36/00* (2009.01)

(52) U.S. Cl.
CPC ............. *H04W 36/14* (2013.01); *H04W 8/22* (2013.01); *H04W 36/0069* (2018.08)

(58) Field of Classification Search
CPC .......... H04L 65/1016; H04W 36/0022; H04W 76/11; H04W 48/18; H04W 36/0027; H04W 8/26; H04W 36/0066; H04W 36/24; H04W 8/22; H04W 36/14; H04W 36/0069
See application file for complete search history.

(56) References Cited

U.S. PATENT DOCUMENTS

2013/0063540 A1    3/2013  Zisimopoulos et al.
2016/0174188 A1*   6/2016  Kim .................... H04L 65/1045
                                                         455/458

(Continued)

FOREIGN PATENT DOCUMENTS

WO    WO-2018/065936 A1    4/2018

OTHER PUBLICATIONS

"5.6 UE Capabilities," 3rd Generation Partnership Project (3GPP), Mobile Competence Centre (2017).

(Continued)

*Primary Examiner* — Allahyar Kasraian
(74) *Attorney, Agent, or Firm* — MARSHALL, GERSTEIN & BORUN LLP

(57) ABSTRACT

To support packet-based call, a first base station (102, 104) receives, by processing hardware, an indication of whether a user device supports packet-based video over a certain RAT (2302). When the processing hardware at the first base station determines (2304), based on the received indication, that the first base station supports packet-based video over the certain RAT, the base station configures radio resources for establishing a new packet-based video call with the user device over the certain RAT (2306), or hands over an existing packet-based video call, established between the first base station and the user device, to a second base station that operates according to the certain RAT (2308).

18 Claims, 22 Drawing Sheets

(56) References Cited

U.S. PATENT DOCUMENTS

| | | | |
|---|---|---|---|
| 2017/0111512 A1 | 4/2017 | Reddy Kothakapu et al. | |
| 2018/0227843 A1* | 8/2018 | Wu | |
| 2019/0191352 A1* | 6/2019 | Chong | H04W 36/08 |
| 2019/0215747 A1* | 7/2019 | Wu | H04W 36/28 |
| 2019/0394688 A1 | 12/2019 | Zhu et al. | |
| 2020/0092879 A1* | 3/2020 | Wu | H04W 76/15 |

OTHER PUBLICATIONS

First Examination Report for India Application No. 20147021068, dated Feb. 23, 2022.
International Search Report and Written Opinion for Application No. PCT/US2019/060088, dated Apr. 23, 2020.
LG Electronics, "Clarification on RAT Fallback," 3rd Generation Partnership Project (3GPP), Mobile Competence Centre (2018).
Mediatek Inc., "Domain Selection Rules and EPS/RAT Fallback," 3rd Generation Partnership Project (3GPP), Mobile Competence Centre (2018).
Qualcomm Inc., "UE Radio Capability for IMS Voice," 3rd Generation Partnership Project (3GPP), Mobile Competence Centre (2018).
"3rd Generation Partnership Project; Technical Specification Group Services and System Aspects; Study for Single Radio Voice Continuity from 5GS to 3G (Release 16)," 3GPP TR 23.756 (2018).
Huawei Technologies Co., Ltd., "Vo5G Technical White Paper," (2018).

* cited by examiner

PROVIDING SUPPORT TO PACKET-DATA VOICE AND VIDEO CALLS

CROSS-REFERENCE TO RELATED APPLICATION

This present application is the US national phase of International Patent Application No. PCT/US2019/060088, filed Nov. 6, 2019, which claims priority to U.S. Provisional Application Nos. 62/757,149, filed Nov. 7, 2018 and 62/770,546, filed Nov. 21, 2018. The priority applications are hereby incorporated by reference in its entirety.

FIELD OF THE DISCLOSURE

This disclosure relates to wireless communications and, more particularly, to supporting packet-based audio and video calls over certain radio access technologies.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Certain specifications related to cellular communication provide protocols according to which a user device (commonly referred to as user equipment, or UE) and a base station exchange information regarding radio resource allocation, channel configuration, signal measurements, service capabilities, etc. The specification 3GPP TS 38.331 for example describes the Radio Resource Control (RRC) protocol for the 5G New Radio (NR) radio access technology (RAT). However, there remain situations where, due to lack of information at a base station regarding the capability of a UE, the base station cannot support certain functionality of the UE. For example, a 5G base station (e.g., a next-generation Node B, or gNB) in some cases cannot properly configure resources for an Internet Protocol (IP) Multimedia Subsystem (IMS) video call or properly hand over such a call.

SUMMARY

Generally speaking, the base station of this disclosure receives an indication of whether a user device supports packet-based video calls over a certain RAT (e.g., IMS video over NR) and configures radio resources for communicating with the UE, or hands over or redirects the UE to another base station that might support this feature, in view of this determination. Further, the base station provides an indication of whether the UE supports packet-based video calls over the certain RAT to the core network to which the base station is connected. In this manner, the core network at a later time can notify base stations of the capabilities of this UE.

According to the various approaches discussed below, the base station can receive indications of support of IMS voice over NR and IMS video over NR via separate fields or the same field, as a single-bit value or a multi-bit value, and in an explicit or implicit format. The indication in some cases indicates support for a particular core network (CN) type (e.g., EPC, 5GC). Further, the base station can receive the notifications from the UE, another base station, or the core network. Still further, the base station can obtain this information by querying the UE (or by receiving a notification from the core network) regarding the same RAT (e.g., NR) or a different RAT, which may be less advanced than the RAT to which the query pertains (e.g., EUTRA). The UE of this disclosure reports its capability to support packet-based video calls over a certain RAT to the base station.

One example implementation of these techniques is a method by a first base station for supporting a packet-based calls. The method includes receiving, at the first base station, an indication of whether a user device supports packet-based video over a certain RAT. When the processing hardware at the first base station determines, based on the received indication, that the first base station supports packet-based video over the certain RAT, the method includes, at the first base station, configuring radio resources for establishing a new packet-based video call with the user device over the certain RAT, or handing over an existing packet-based video call, established between the first base station and the user device, to a second base station that operates according to the certain RAT.

Another example implementation of these techniques is a base station with processing hardware configured to implement the method above for supporting a packet-based call.

Another example implementation of these techniques is a method in a user device for establishing video calls. The method includes transmitting, to a first base station, an indication of whether the user device supports packet-based video over a certain RAT and receiving one of (i) a radio resource configuration message indicating resources for establishing a new video call over the certain RAT or (ii) a command to hand over an existing packet-based video call, established between the first base station and user device, to a second base station that operates according to the certain RAT.

Another example implementation of these techniques is a user device with processing hardware configured to implement the method above for establishing video calls.

Yet another example implementation of these techniques is a method in a first base station for supporting packet-based calls. The method includes receiving an indication of whether a user device supports packet-based video calls over a certain RAT, generating, based on the received indication, a notification of whether the user device supports packet-based video calls over the certain RAT, and transmitting the notification to a core network to which the base station is connected.

Still another example implementation of these techniques is a base station with processing hardware configured to implement the method above for supporting packet-based video call.

BRIEF DESCRIPTION OF THE DRAWINGS

FIG. 3 is a messaging diagram of an example scenario in which the 5G NR base station obtains an indication of NR capabilities of the user device by querying the user device regarding its NR capabilities, and configures radio resources for an IMS/NR video call over the base station in accordance with the obtained indication;

FIG. 4 is a messaging diagram of an example scenario in which the 5G NR base station obtains an indication of NR capabilities of the user device from a 5GC, and configures radio resources for an IMS/NR video call over the base station in accordance with the obtained indication;

FIG. 5 is a messaging diagram of an example scenario in which the EUTRA base station obtains an indication of NR capabilities of the user device by querying the user device regarding its EUTRA or NR capabilities, and coordinates a handover of an IMS video call to a 5G NR base station in accordance with the obtained indication;

FIG. 6 is a messaging diagram of an example scenario in which the EUTRA base station of obtains a description of EUTRA capabilities of the user device, including an indication of support of IMS voice and IMS video over NR, from the evolved packet core (EPC) or the 5GC, and coordinates a handover of an IMS video call to a 5G NR base station in accordance with the obtained indication;

FIG. 7 is a messaging diagram of an example scenario in which the NR base station of FIG. 1 obtains a description of NR capabilities of the user device by querying the user device, and coordinates a handover of an IMS video call to a EUTRA base station in accordance with the obtained indication;

FIG. 8 is a messaging diagram of an example scenario in which the NR base station of FIG. 1 obtains a description of NR capabilities of the user device, including an indication of support of IMS voice and IMS video over NR, from the 5GC, and coordinates a handover of an IMS video call to a EUTRA base station in accordance with the obtained indication;

FIG. 9 is a messaging diagram of an example scenario in which the 5G NR base station of FIG. 1 obtains an indication of NR and EUTRA capabilities of the user device by querying the user device regarding its NR capabilities, and coordinates a handover of an IMS video call to a EUTRA base station in accordance with the obtained indication;

FIG. 10 is a messaging diagram of an example scenario in which the NR base station of FIG. 1 obtains a description of NR and EUTRA capabilities of the user device from the 5GC, and coordinates a handover of an IMS video call to a EUTRA base station in accordance with the obtained indication;

FIG. 11 is a messaging diagram of an example scenario in which the EUTRA base station or the 5G NR base station obtains an indication of NR, or NR and EUTRA, capabilities of the user device by querying the user device regarding its NR capabilities, and provides a corresponding indication to the 5GC;

FIG. 12 is a messaging diagram of an example scenario in which the EUTRA base station or the 5G NR base station obtains an indication of NR, or NR and EUTRA/5GC, capabilities of the user device by querying the user device regarding its EUTRA capabilities, and provides a corresponding indication to the 5GC;

FIG. 13 is a messaging diagram of an example scenario in which the EUTRA base obtains an indication of NR, or and NR and EUTRA/5GC, capabilities of the user device by querying the user device regarding its EUTRA capabilities, and provides a corresponding indication to the EPC;

FIG. 14 is a messaging diagram of an example scenario in which the EUTRA base obtains an indication of NR, or and NR and EUTRA/5GC, capabilities of the user device by querying the user device regarding its NR capabilities, and provides a corresponding indication to the EPC;

FIG. 15 is a flow diagram of an example method in the user device for transmitting an indication that the user device supports IMS video over NR, to the 5G NR base station in a response to a query regarding NR capabilities of the user device;

FIG. 16 is a flow diagram of an example method in the 5G NR base station for obtaining NR capability indicating support of IMS video over NR from the user device, and accordingly configuring resources for a new IMS video over NR call or redirecting/handing over the user device to the EUTRA base station;

FIG. 17 is a flow diagram of an example method in the user device for transmitting an indication that the user device supports IMS video over NR, to the EUTRA base station in a response to a query regarding EUTRA capabilities of the user device;

FIG. 18 is a flow diagram of an example method in the EUTRA base station for obtaining EUTRA capability of the user device, indicating IMS video over NR support from the user device and accordingly handing over the user device to the 5G NR base station or changing the type of the call;

FIG. 19 is a flow diagram of an example method in the user device for transmitting an indication that the user device supports IMS video over NR, to the EUTRA base station in a response to a query regarding NR capabilities of the user device;

FIG. 20 is a flow diagram of an example method in the EUTRA base station for obtaining NR capability indicating IMS video over NR support from the user device and, in accordance with the obtained capability, handing over the user device to the 5G NR base station or changing the type of the call;

FIG. 21 is a flow diagram of an example method in the 5G NR base station for obtaining NR capability indicating IMS video over NR support from the user device and, in accordance with the obtained capability, handing over the user device to the EUTRA base station or changing the type of the call.

FIG. 23 is a flow diagram of an example method in a base station for supporting packet-based video calls over a certain RAT;

FIG. 24 is a flow diagram of an example method in a user device for establishing packet-based video calls; and FIG. 25 is a flow diagram of an example method in a base station for notifying a core network of whether a user device supports packet-based voice and/or video calls.

DETAILED DESCRIPTION OF THE DRAWINGS

Figure 1:
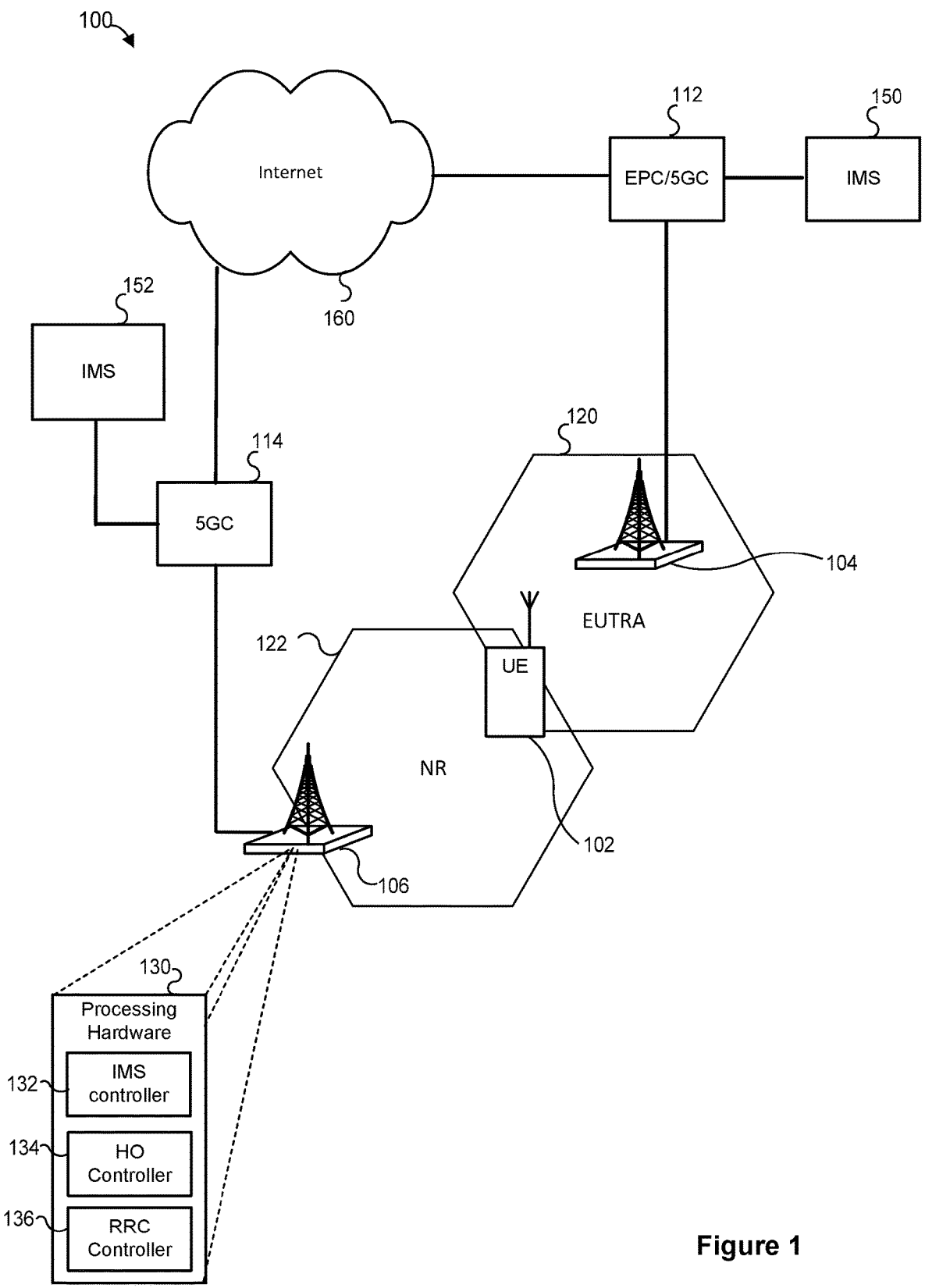
FIG. 1 is a block diagram of an example wireless communication network in which a base station of this disclosure can support an IP Multimedia Subsystem (IMS) video call originated or terminated at a user device, in accordance with the capabilities of the user device.

FIG. 1 depicts an example wireless communication network 100 in which a user device in various scenarios can be configured to support packet-based audio and video calls over certain RATs and core networks (CNs), or not support certain types of packet-based calls. A base station in this wireless communication network can obtain an indication of capabilities of the user device and, in view of these capabilities, configures radio resources for communicating with the user device, redirects the user device to a carrier frequency associated with another RAT, or hands over the user device to another base station that might support the relevant type of packet-based video call.

The examples below refer primarily IMS video calls performed over NR or EUTRA RATs, with the corresponding base stations connected to 5GC or EPC core networks. Some of the examples also concern handovers of IMS voice calls between EUTRA and NR cells. In general, however, the techniques of this disclosure also can apply to other types of packet-based calls, other RATs, and other core networks.

Referring to FIG. 1, the UE 102 can be any suitable device capable of wireless communications (as further discussed below). The wireless communication network 100 includes a EUTRA base station 104 connected to a core network 112, which in different implementations can be an EPC or a 5GC, and a 5G NR base station 106 connected to a 5GC 114. The base station 104 can operate as an evolved Node B (eNB) or, in those implementations where the core network 112 is a 5GC, as a next-generation eNB (ng-eNB). The 5G NR base station 106 operates as a next-generation Node B (gNB). The base station 104 covers a EUTRA cell 120, and the base station 106 covers an NR cell 122.

The UE 102 can support EUTRA and 5G NR (or simply, "NR") air interfaces. When the UE 102 operates in the EUTRA cell 120, the UE 102 exchanges messages with the base station 104 using the EUTRA air interface. However, when the UE 102 operates in the NR cell 122, the UE 102 exchanges messages with the base station 106 using the 5G NR air interface.

In general, the wireless communication network 100 can include any number of base stations, and each of the base stations can cover one, two, three, or any other suitable number of cells.

The EPC/5GC 112 and the 5GC 114 can be connected to an IMS 150 and an IMS 152, respectively. Depending on the implementation, the IMS 150 and the IMS 152 may be the same IMS or different instances of an IMS. In any case, the IMS 150 or 152 can support the Session Initiation Protocol (SIP) and the Internet Protocol (IP), and include control servers or modules to implement various Call Session Control Functions (CSCFs). Each of the IMS 150 or 152 can include a Proxy CSCF (P-CSCF) module, an Interrogating CSCF (I-CSCF) server, a Home Subscriber (HSS) server, and a Serving CSCF (C-CSCF) module (none shown to avoid clutter). The EPC/5GC 112 and the 5GC 114 also can be connected to the Internet 160. Depending on the implementation, the 5GC 112 and the 5GC 114 may be the same 5GC or different instances of an 5GC.

In some example implementations, the UE 102 supports IMS video over NR as well as IMS video EUTRA. The UE 102 in one such case supports IMS video over EUTRA when the base station is connected to an EPC ("IMS video over EUTRA/EPC") as well as when the base station is connected to a 5GC ("IMS video over EUTRA/5GC"). In another case, the UE 102 supports IMS video over EUTRA/5GC but not IMS video over EUTRA/EPC. Further, the UE 102 in some implementations supports IMS video over EUTRA/EPC but not IMS video EUTRA/5GC. Still further, the UE 102 in some implementations supports neither IMS video over EUTRA/5GC nor IMS video EUTRA/EPC. The UE 102 in various implementations can support or not support IMS voice for various combinations of RATs and CN types.

Moreover, the UE 102 in various implementations can support or not support certain types of handover between EUTRA/EPC, EUTRA/5GC, and NR configurations.

In some cases, when the UE 102 supports certain services, the UE 102 also must support other services. For example, when the UE 102 supports IMS video over NR, the UE 102 according to some implementations must necessarily support IMS voice over NR; however, when the UE 102 supports IMS voice over NR, this UE does not necessarily support IMS video over NR.

With continued reference to FIG. 1, the base station 106 is equipped with processing hardware 130 that can include one or more general-purpose processors (e.g., CPUs) and a non-transitory computer-readable memory storing instructions that the one or more general-purpose processors execute. Additionally or alternatively, the processing hardware 130 can include special-purpose processing units. The processing hardware in an example implementation includes an IMS controller 132 configured to support IMS calls of certain types and for certain RATs/CN types with user devices operating in the cell 122, including the UE 102, a handover (HO) controller 104 to coordinate handovers to the cells, including the cell 120 of the base station 104, and a radio resource control (RRC) controller 136 to implement procedures and messaging at the RRC sublayer of the protocol communication stack.

The base station 104 may include generally similar components. However, the IMS controller of the base station 104 can be configured to support IMS/EUTRA calls with user devices operating in the cell 120.

Figure 2:
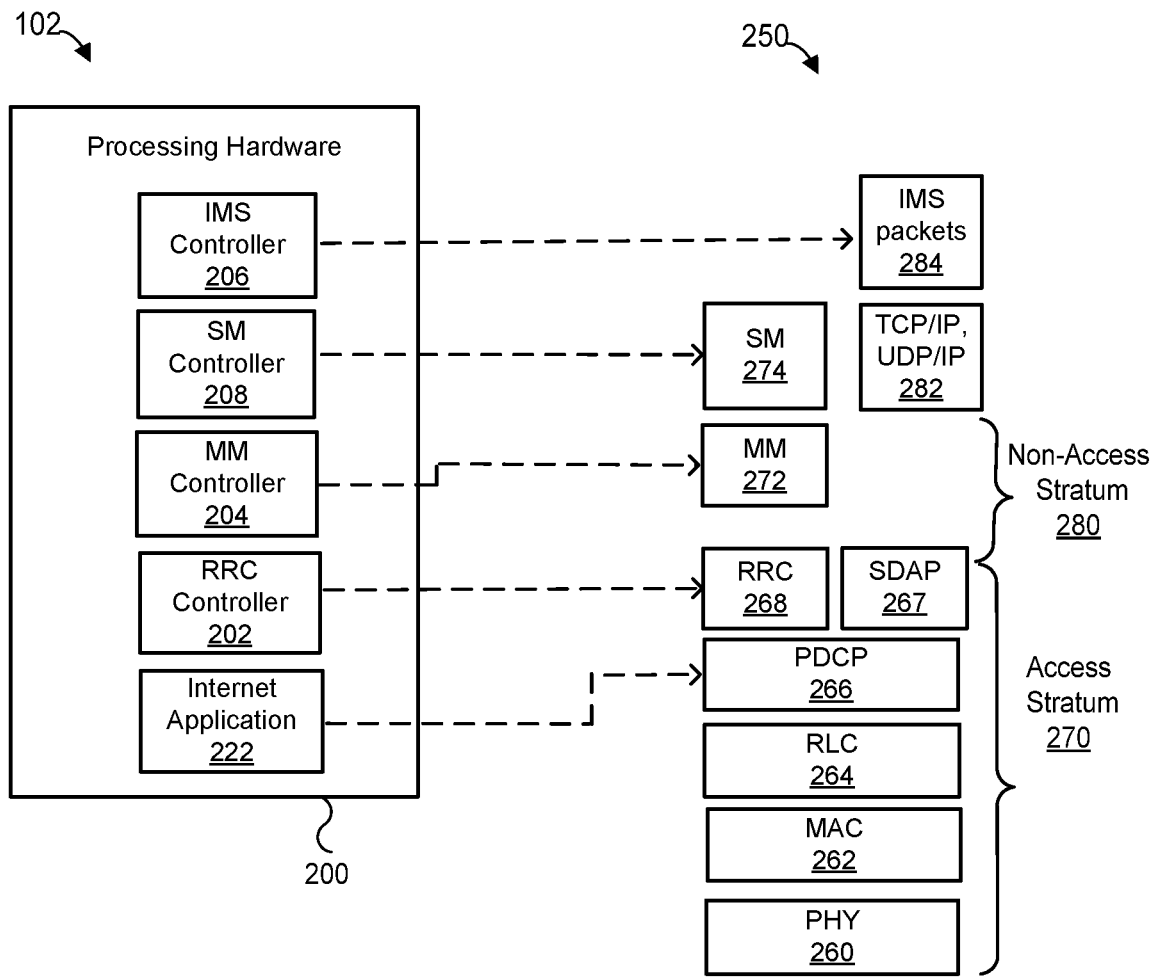
FIG. 2 illustrates example processing hardware of the user device of FIG. 1, including an IMS video controller configured to provide an indication of the capabilities of the user device to a base station.

Next, FIG. 2 depicts various components of the UE 102. In particular, the UE 102 can be equipped with processing hardware 200 including one or more general-purpose processors (e.g., CPUs) and a non-transitory computer-readable memory storing instructions that the one or more general-purpose processors execute. Additionally or alternatively, the processing hardware 200 can include special-purpose processing units.

The processing hardware 200 can include an RRC controller 202, a mobility management (MM) controller 204, an IMS controller 206, and a Session Management (SM) controller 208. Each of the controllers 202, 204, 206, and 208 is responsible for inbound messaging, outbound messaging, and internal procedures at the corresponding layer of a protocol stack 250. In addition to supporting messaging external to the UE 102, the controllers 202, 204, 206, and 208 can exchange internal messages with each other as well as with other components of the UE 102, such as an Internet application 222, for example. Each of the controllers 202, 204, 206, and 208 can be implemented using any suitable combination of hardware, software, and firmware. In one example implementation, the controllers 202, 204, 206, and 208 are sets of instructions that define respective components of the operating system of the UE 102, and one or more CPUs execute these instructions to perform the corresponding functions. In another implementation, some or all of the controllers 202, 204, 206, and 208 are implemented using firmware as a part of the wireless communication chipset.

The protocol stack 250 includes a physical layer 260 (commonly abbreviated as PHY), a medium access control (MAC) layer 262, a radio link control (RLC) layer 264, a packet data convergence protocol (PDCP) sublayer 266, a service data adaption protocol (SDAP) sublayer 267, and the RRC sublayer 268 as part of the access stratum 270. These layers are ordered as illustrated in FIG. 2. The non-access stratum 280 of the protocol stack 250 includes, among other sub-layers, an MM sublayer 272 for exchanging messages related to registration/attachment and location updates, for example, and an SM sublayer 274 for exchanging messages related to PDU session establishment, PDU session modification, PDU session authentication and PDU session release, for example. The MM sublayer can correspond to an Evolved MM (EMM) sublayer for evolved packet system (EPS) non-access-stratum (NAS) procedures and a 5G MM (SGMM) sublayer for 5th generation system (5GS) NAS procedures. The protocol stack 250 also can support higher-layer protocols for various services and applications, including for example TCP/IP and UDP/IP layer 282 and a set 284 of protocols for packet-based voice and/or packet-based video. The controllers 202, 204, 206, and 208 generate outbound messages and process inbound messages corresponding to the layers or sublayers 268, 272, 284, and 274, respectively, as schematically illustrated in FIG. 2. The controllers 202, 204, 206, and 208 also carry out procedures internal to the UE 102.

Next, several example scenarios that involve several components of FIG. 1 and related to IMS video calls are discussed next with reference to FIGS. 3-14.

Figure 3:
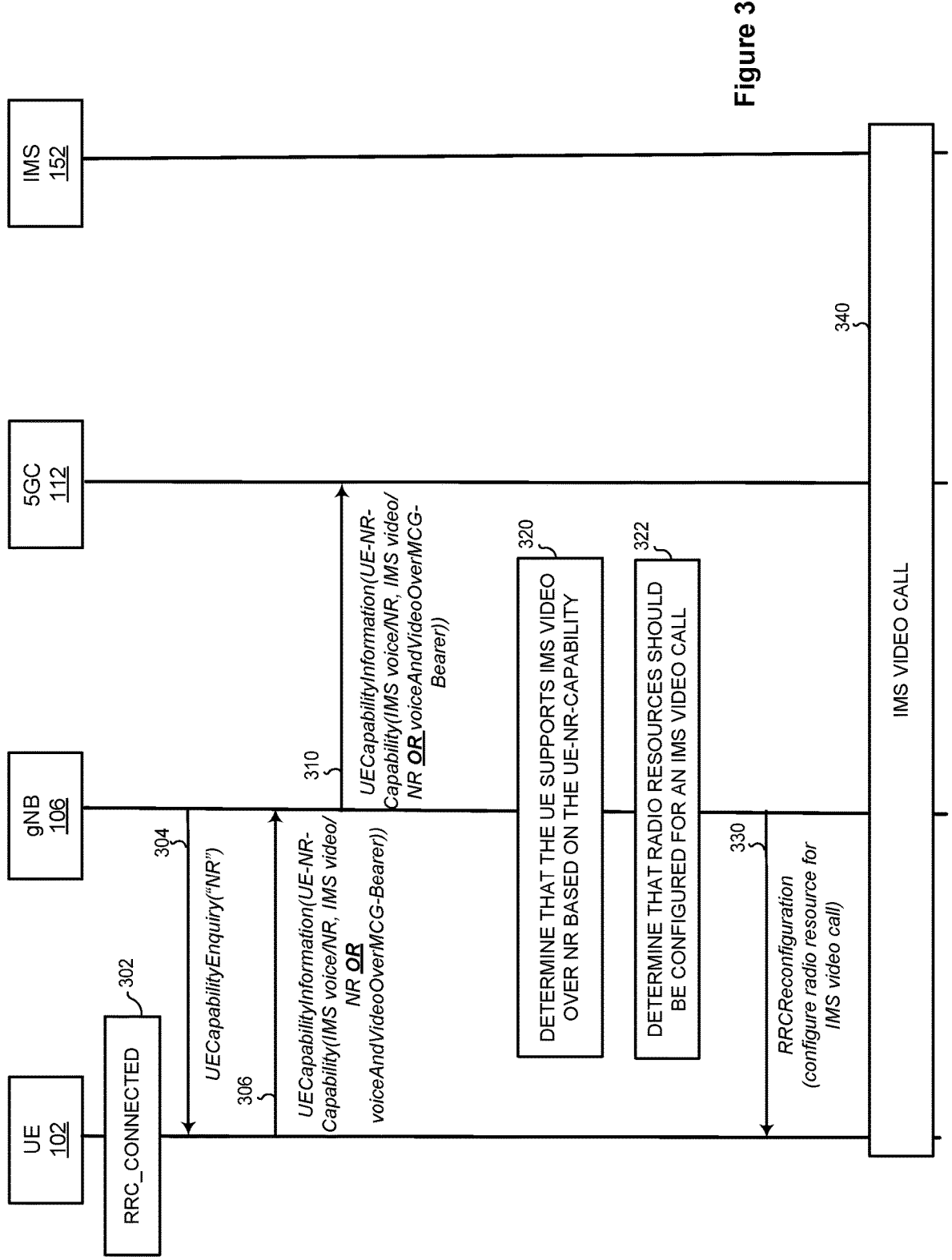
FIGS. 3-21 illustrate several example scenarios and methods in one or several components illustrated in FIG. 1, in particular.

FIG. 3 is a messaging diagram of an example scenario in which UE 102 initially is in the RRC_CONNECTED state 302, and thus the UE 102 and the gNB 106 already have completed the RRC Setup procedure and can exchange messages over an active connection at the RRC sublayer. The gNB 106 transmits 304 a message UECapabilityEnquiry to the UE 102 and specifies "NR" as a parameter, so as to query the UE 102 regarding its NR capability. As discussed below, the gNB 106 in some cases can include other parameters in the UECapabilityEnquiry message to query the UE 102 regarding its other capabilities.

The UE 102 can reply 306 to the gNB 106 with a UECapabilityInformation message. Depending on the implementation, the UECapabilityInformation message can indicate support of IMS video over NR explicitly or implicitly, using a dedicated field or a field that conveys additional information.

In one example, the UECapabilityInformation message indicates support of IMS voice over NR in a first NR RRC field of the UE-NR-Capability information element (IE), and indicates support of IMS video over NR in a second NR RRC field in the UE-NR-Capability IE. The first and second NR RRC fields can be for example voiceOverMCG-Bearer and videoOverMCG-Bearer, respectively. More specifically, presence of the voiceOverMCG-Bearer field in the IE can indicate that the UE 102 supports IMS voice over NR, while absence of the voiceOverMCG-Bearer field in the IE can indicate that the UE 102 does not support IMS voice over NR. Similarly, presence of the videoOverMCG-Bearer field in the IE can indicate that the UE 102 supports IMS video over NR, while absence of the videoOverMCG-Bearer field in the IE can indicate that the UE 102 does not support IMS video over NR. In another implementation, the voiceOverMCG-Bearer and videoOverMCG-Bearer fields are always present in the IE, but different values (e.g., "1" and "0," or "yes" and "no") indicate support or lack of support, respectively, of the corresponding feature.

In some implementations, the UE 102 and the gNB 106 can implement additional conditions with respect to these two fields. For example, presence or a certain value (e.g., "1" or "yes") of the videoOverMCG-Bearer field can indicate support of both IMS video over NR and IMS voice over NR. As another example, when the UE 102 includes the second NR RRC field (indicating support of video) in the UE-NR-Capability IE, the UE 102 must also include the first NR RRC field (indicating support of voice); conversely, when the UE 102 omits the second NR RRC field, the UE 102 must also omit the first NR RRC field.

In another example, the UECapabilityInformation message indicates support of IMS voice over NR as well as IMS video over NR via a single field, e.g., voiceAndVideoOverMCG-Bearer. The UE 102 can include this field in the UE-NR-Capability IE or another suitable information element. Presence of this field in the UE-NR-Capability IE, or a certain value of this field (e.g., "1"), can indicate that the UE 102 supports IMS voice over NR as well as IMS video over NR. On the other hand, absence of this field the UE-NR-Capability IE, or a certain value of this field (e.g., "0"), can indicate that the UE 102 supports neither IMS voice over NR nor IMS video over NR.

In another implementation, when UE 102 supports IMS voice over NR but does not support IMS video over NR, the UE 102 does not include this field (which can be called voiceAndVideoOverMCG-Bearer as discussed above) in the UE-NR-Capability IE. The UE 102 in this case includes the field in the UE-NR-Capability IE only when the UE 102 supports both IMS video over NR and IMS voice over NR. Thus, the gNB 106 in this implementation assumes that the UE 102 supports IMS voice over NR in the absence of the field.

With continued reference to FIG. 3, the gNB 106 can provide 310 the capability information received from the UE 102 to the 5GC 112. The gNB 106 for example can transmit a UE Radio Capability Info Indication message including the capability information to the 5GC 112, or can simply forward the UE-NR-Capability IE to the 5GC 112 using any other suitable format to convey an indication of whether the UE 102 supports IMS voice over NR. Thus, the gNB 106 can use dedicated fields to indicate support of voice and video, a shared field, etc. The 5GC 112 can store the capability information of the UE 102 for subsequent retrieval. In particular, as discussed in more detail below, the gNB 106 or another base station subsequently can obtain an indication of the capability of the UE 102 from the 5GC 112 by transmitting an Initial UE Message and receiving the UE-NR-Capability IE in the Initial Context Setup Request message or another suitable message, without querying the UE 102.

At block 320, the gNB 106 can determine whether the UE 102 supports IMS video over NR based on the information received from the UE 102. The gNB 106 in a similar manner can determine whether the UE 102 supports IMS voice over NR, also based on the information received from the UE 102. It is noted that the gNB 106 can execute block 320 and transmit 310 the capability information in any desired order. The UE 102 in the meantime can exchange IMS signaling messages (e.g. Session Initiation Protocol (SIP) messages) with the IMS 152 via the 5GC 112 to establish an IMS video call. When the gNB 106 determines that the UE 102 does not support IMS video over NR, the gNB 106 can hand over or redirect the UE 102 to a EUTRA cell, as further discussed below.

Otherwise, the gNB 106 can determine 322 how the gNB 106 should configure resources for an IMS call in accordance with the determination of UE capabilities at block 320. The IMS call can be a mobile-originated (MO) call or a mobile-terminated (MT) call. Although the gNB 106 configures an IMS video call in the example of FIG. 3, the IMS call in general can be a voice call or a video call.

In one example scenario, the gNB 106 determines that the UE 102 supports IMS voice over NR as well as IMS video over NR according to the received UE-NR-Capability IE (which, as discussed above, can include separate fields to indicate supports of these functions or a shared field). The gNB 106 configures 5G NR radio resources so that the UE 102 can transmit and receive packets of an IMS voice call, in accordance with the determination. The gNB 106 for example can generate a data radio bearer (DRB) configuration configuring a certain DRB to transmit voice packets. Further, the gNB 106 in accordance with the determination configures 5G NR radio resources so that the UE 102 can transmit and receive packets of an IMS video call. The gNB 106 to this end can configure another DRB to transmit video packets. Thus, the gNB 106 can configure two DRBs for voice and video packets, respectively.

The gNB then transmits 330 an RRC Reconfiguration message to configure the radio resources as determined at block 330. The UE 102 then can establish an IMS video call with the IMS video 152 via the gNB 106 and the 5GC 112, as indicated at block 340.

In another scenario, however, the gNB 106 determines that the UE 102 supports IMS voice over NR but does not support IMS video over NR according to the received UE-NR-Capability IE. The gNB 106 in this case can configure a certain DRB to transmit voice packets, and not configure a DRB to transmit video packets. To support an IMS video call, the gNB 102 in this case can coordinate a handover to a EUTRA cell or a redirect the UE 102 to a EUTRA carrier.

More specifically, the gNB 106 in one such case transmits a handover command to the UE 102. The handover command specifies that the UE 102 should hand over to the EUTRA cell 120 of the EUTRA base station 104, so that the UE 102 then can originate or receive the IMS video call in the cell 120. The EUTRA base station 104 in general can be an eNB or an ng-eNB, depending on whether the base station 104 is connected to an EPC or a 5GC. Accordingly, the discussion below refers to the EUTRA base station 104 as an eNB or an ng-eNB, depending on the implementation. The UE 102 performs the handover procedure and transmits a Handover Complete message to the eNB 104 via the EUTRA cell 120. The eNB 104 then configures radio resources for the UE 102. In particular, eNB station 104 can transmit this configuration in the Handover command or in the RRC Connection Reconfiguration message, after receiving the Handover Complete message. Similar to the gNB 106, the eNB 104 can configure respective DRBs for voice and video packets. Further, the eNB 104 may configure radio resources for transmitting or receiving IMS signaling messages (e.g. SIP messages) to the UE 102. The eNB 104 can include this configuration in the Handover Command or in one of RRC Connection Reconfiguration messages. After completing a handover to the eNB 104, the UE 102 can transmit an IMS signaling message to the eNB 104 to establish the IMS video call, over a certain DRB.

In another scenario, upon determining that the UE 102 does not support IMS video over NR, the gNB 106 transmits, to the UE 102, a redirection command to redirect the UE 102 to a EUTRA carrier. The UE 102 then selects an EUTRA cell on the EUTRA carrier in response to the redirection command. For example, the UE 102 can select the EUTRA cell 120. The UE 102 in this case can transmit an RRC Connection Request message to the eNB 104 via the EUTRA cell 120, and in response receive an RRC Connection Setup message from the eNB 104. The RRC Connection Setup message can indicate a certain signaling radio bearer (SRB), and the UE 102 can establish the SRB accordingly. The UE 102 then can transmit, in response to the RRC Connection Setup message, an RRC Connection Setup Complete message on the SRB to the eNB 104 via the EUTRA cell 120.

The eNB 104 can configure radio resources for transmitting packets or receiving packets of the IMS video call in an RRC Connection Reconfiguration message, which the eNB 104 can transmit to the UE 102. These radio resources can include DRBs, and the packets include SIP messages, video packets, and voice packets. The UE 102 can transmit an RRC Connection Reconfiguration Complete message in response to the RRC Connection Reconfiguration message. The UE 102 then transmit and receive SIP messages over a first DRB, transmit and receive video packets over a second DRB, and transmit and receive voice packets over a third DRB.

In any case, when the gNB 106 determines that the UE 102 does not support IMS video over NR, the gNB 106 allows the UE 102 to establish an IMS video call according to another configuration, rather than drop the call.

Figure 4:
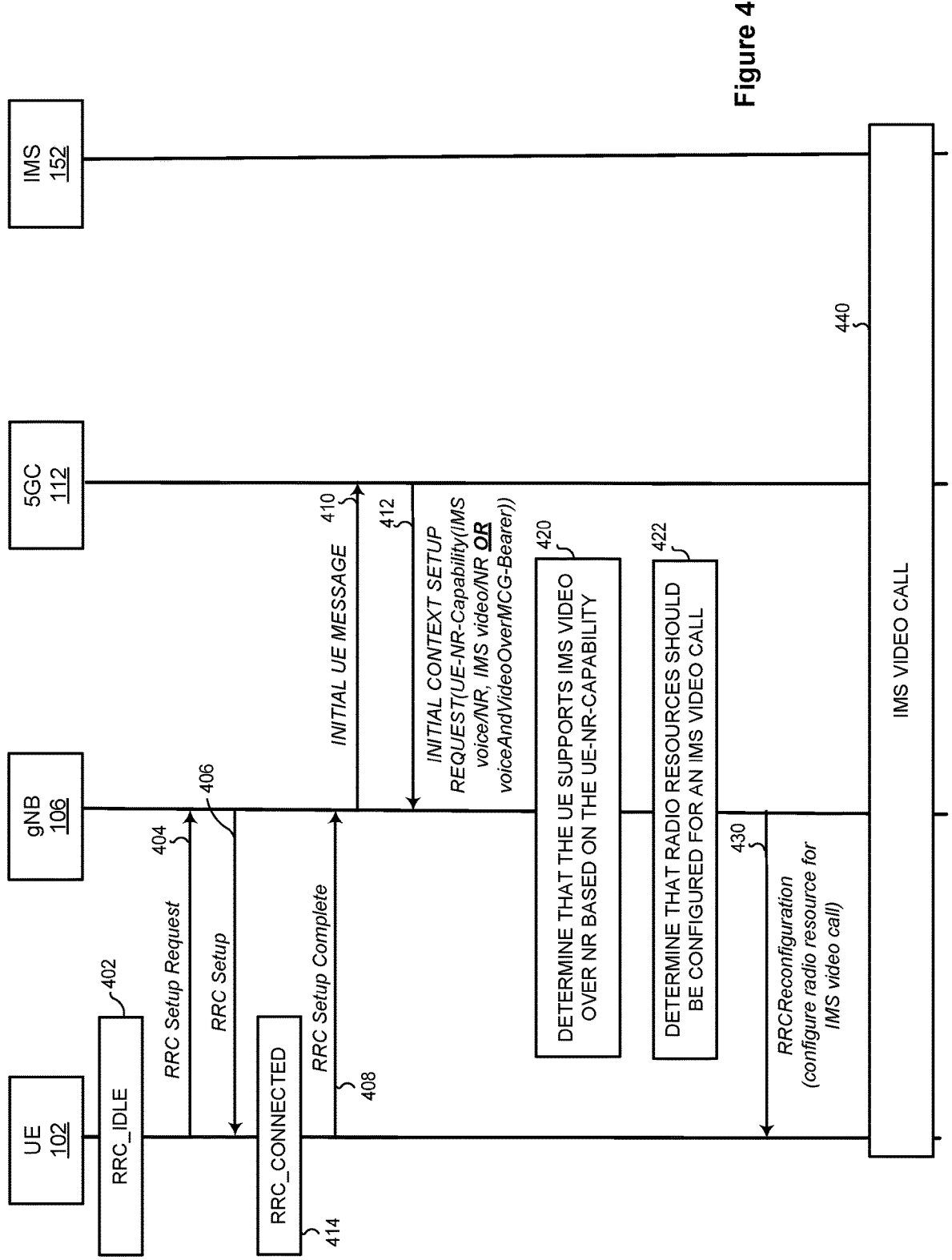

Next, FIG. 4 illustrates a messaging diagram 400 of an example scenario in which the gNB 106 obtains an indication of NR capabilities of the UE 102 from the 5GC 112 rather than directly from the UE 102.

In particular, the UE 102 in this scenario initially is in the RRC_IDLE state 402. Generally speaking, when the UE 102 is in RRC_IDLE state, the 5GC 112 is aware of the UE 102, but the gNB 106 is not aware of the UE 102, and thus there is no active RRC connection between the UE 102 and the gNB 106.

The 5GC 112 can store information identifying the UE 102 as well as capability information of the UE 102, such as an indication whether the UE 102 supports IMS voice NR and/or IMS video over NR. As discussed above with reference message 310 of FIG. 3, the 5GC 112 may have received this information from the UE 102 via the gNB 106 or another 5G NR base station.

The UE 102 can transmit 404 an RRC Setup Request message to the gNB 106 to initiate the process of establishing an RRC connection with the gNB 106. In response to receiving the RRC setup request message, the gNB 106 can transmit 406 an RRC Setup message to the UE 102. In response to receiving the RRC Setup message, the UE 102 can establish an SRB, transition to the RRC_CONNECTED state 414, and transmit 408 an RRC setup complete message to the gNB 106, on the established SRB.

After completing the RRC setup procedure, the gNB 106 can transmit 410 to the 5GC 112 an Initial UE Message identifying the UE 102. In response to receiving the Initial UE Message, the 5GC 112 can access capability information of the UE 102, e.g., in the form of UECapabilityInformation that the 5GC 112 previously received. Similar to the examples discussed above, the 5GC 112 can store information indicating that the UE 102 supports IMS voice over NR, IMS video over NR, or both. The 5GC 112 can transmit 412 an Initial Context Setup Request message to the gNB 106. This message can include an UE-NR-Capability IE indicating the capabilities of the UE 102.

Next, the gNB 106 at block 420 can determine whether the UE 102 supports IMS voice over NR and/or IMS video over NR based on the information received from the 5GC 112. When the gNB 106 determines that the UE 102 does not support IMS voice and/or video over NR, the gNB 108 can hand over or redirect the UE 102 to a EUTRA cell. Otherwise, the gNB 106 can determine 422 how it should configure resources for an IMS call, similar to block 322 of FIG. 3, and transmit 430 an RRC Reconfiguration message to the UE 102, similar to the transmission 330 discussed above.

The UE 102 then can establish 440 an IMS video call with the IMS video 152 via the gNB 106 and the 5GC 112. Further, when the 5GC 112 indicates that the UE 102 does not support IMS video over NR, the gNB 106 can transmit a handover command to the UE 102 or redirect the UE to 102 to a EUTRA carrier, as discussed above with reference to FIG. 3.

Thus, as discussed above, the gNB 106 can receive or obtain an indication of the capability of the UE 102 directly from the UE 102 or from the 5GC 112. In some implementations, the gNB 102 also can receive an indication of the capability of the UE 102 from another 5G NR base station or a EUTRA base station configured to operate as an ng-eNB (i.e., connected to a 5GC rather than an EPC), e.g. in a Retrieve UE Context Response message during a Retrieve UE Context procedure or in a Handover Request Acknowledge message during a Handover Preparation procedure. In this case, the base stations can communicate over the Xn interface or another suitable interface. Depending on the implementation, one base station can indicate IMS voice over NR and IMS video over NR capabilities of the UE 102 using the UE-NR-Capability IE or any other suitable information element.

In contrast to the approaches of FIGS. 3 and 4, when a 5G NR base station relies on the assumption that a UE supports IMS video over NR based on an indication of support of IMS voice over NR, for example, the UE in some cases fails to establish an IMS video call. Because a certain UE may support IMS voice NR but not IMS video over NR, a 5G NR base station in some cases may allocate radio resources for an IMS video NR, but the UE drops the IMS video call because it is not configured to utilize these resources. In other words, the gNB in this scenario is now aware of lack of support of IMS video over NR at the UE, and accordingly fails to initiate a handover or a redirect.

Further, in some cases, a UE and an eNB successfully establish an IMS video call over EUTRA (also known as Video over LTE or ViLTE), and the eNB successfully hands over the call to a 5G NR cell. However, if the eNB does not determine whether the UE supports IMS video over NR, the UE can drop the call when in the RRC_CONNECTED state on the 5G NR carrier. Still further, a UE and a gNB can successfully establish an IMS video call over NR, but when the gNB is not aware of whether the UE supports IMS video over NR, the UE does not configure the UE to perform EUTRA measurements. As a result, when the NR signals gets weak, the UE can drop the call, and the gNB does not initiate a handover.

Several scenarios in which the techniques of this disclosure allow base stations and UE to handover IMS calls of certain types are considered next. In these examples, the EUTRA base station 104 can be an eNB or an ng-eNB, but is referred to below as an eNB for convenience.

Figure 5:
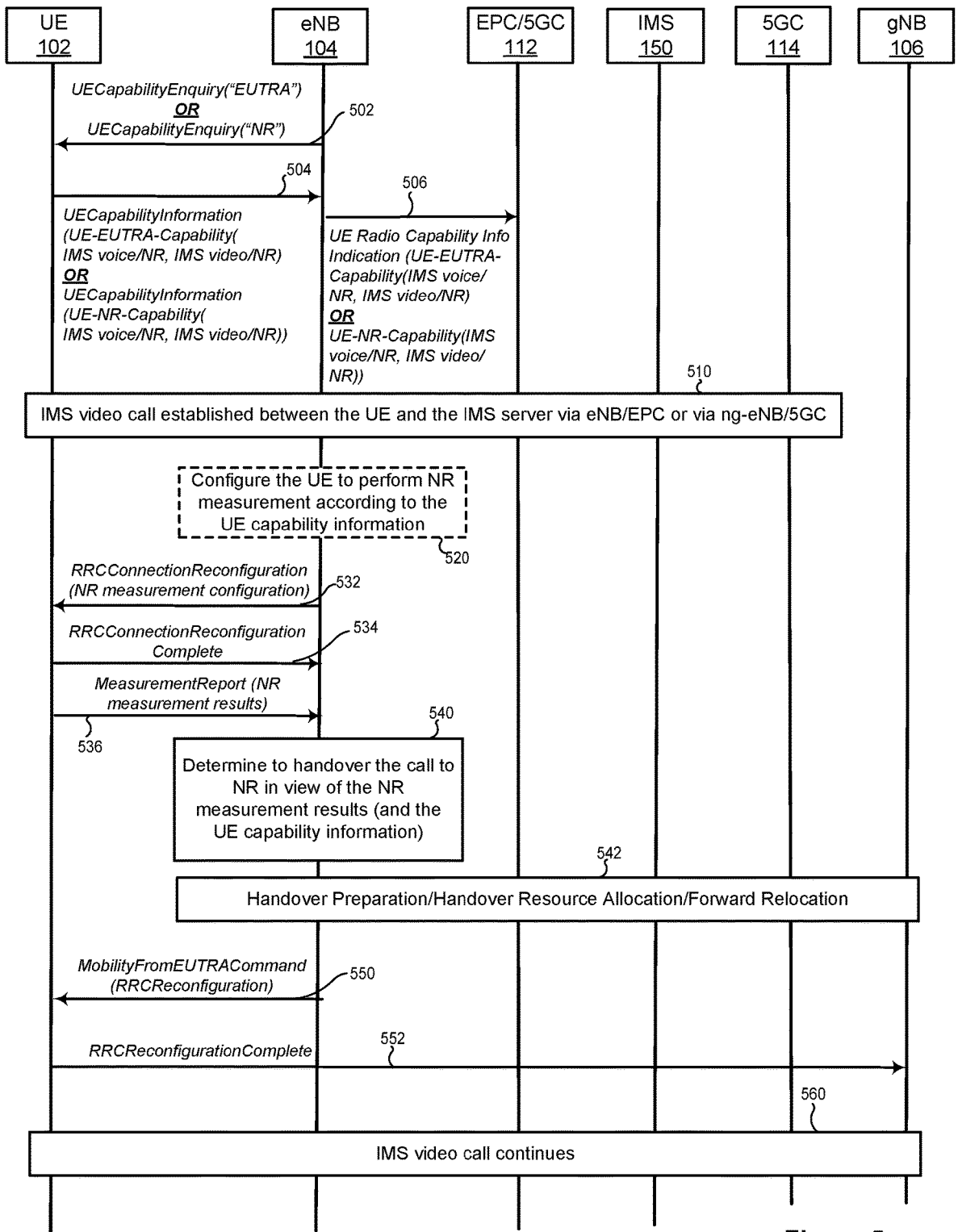

FIG. 5 depicts a messaging diagram of an example scenario in which the eNB 104 obtains an indication of NR capabilities of the UE 102 by querying the UE 102 regarding its EUTRA or NR capabilities, and coordinates a handover of an IMS video call to the gNB 106 station in accordance with the obtained indication.

The eNB 104 first transmits 502 a message UECapabilityEnquiry to the UE 102 to query the UE 102 (at least in part) regarding its IMS call capability. This message can be similar to the UECapabilityEnquiry message discussed with reference to FIG. 3, but the eNB 104 in different implementations can query the UE 102 regarding its NR or EUTRA capabilities.

According to one implementation, the UECapabilityEnquiry refers to EUTRA, and thus the UE 102 responds 504 with a UECapabilityInformation message that includes a UE-EUTRA-Capability IE. Although this IE pertains to EUTRA, the UE 102 in this implementation includes one or more fields to indicate support of IMS voice over NR and IMS video over NR. Similar to the examples above, the UE 102 can utilize a single field or multiple fields, such as voiceOverMCG-Bearer and/or videoOverMCG-Bearer. The UE 102 encodes the IMS voice over NR and IMS video over NR fields in EUTRA RRC ASN.1 format, according to one implementation.

According to another implementation, the UECapabilityEnquiry refers to NR, and thus the UE 102 responds 504 with a UECapabilityInformation message that includes a UE-NR-Capability IE. More particularly, UE 102 in this implementation can include one or more fields to indicate support of IMS voice over NR and IMS video over NR. The UE 102 encodes the IMS voice over NR and IMS video over NR fields in NR RRC ASN.1 format, according to one implementation. Moreover, the UECapabilityEnquiry in yet another implementation can refer to both EUTRA and NR, and the UE 102 responds 504 with a UECapabilityInformation message that includes a UE-EUTRA-Capability IE as well as a UE-NR-Capability IE.

The eNB 106 can send 506, to the EPC or 5GC 112, information indicative of the capability of the UE 102, similar to the message 310 discussed above.

The UE 102 can establish 510 an IMS video call between the UE 102 and the IMS 150. When the eNB 104 is connected to an EPC, the UE 102 establishes an IMS video call with the IMS 150 over eNB/EPC without transmitting a capability of the UE 102 indicating support of IMS video over EUTRA/EPC. In another case, when the ng-eNB 104 is connected to a 5GC, the UE 102 establishes an IMS video call with the IMS 150 (or the IMS 152) over ng-eNB/5GC according to the capability of the UE 102, when the UE capability indicates support of IMS video over EUTRA/5GC.

In some cases, the eNB 104 executes an optional step 520 and determine whether the UE 102 should perform NR measurement, in view of the NR capability of the UE 102. In particular, the eNB 104 can configure the UE 102 to perform NR measurements when the UE-EUTRA-Capability IE or the UE-NR-Capability IE indicates that the UE 102 supports IMS video over NR, and thus there is a possibility that the eNB 104 will initiate a handover of the UE 102 to a 5G NR cell while an IMS video call is in progress. However, if the UE-EUTRA-Capability IE or the UE-NR-Capability IE indicates that the UE 102 does not support IMS video over NR, the eNB 104 can determine that there is no need to configure the UE 102 to perform NR measurements. In other implementations, the eNB 104 does not execute the optional step 520 and configures the UE 102 to perform NR measurements regardless of the IMS video over NR capability of the UE 102.

When applicable, the eNB 104 can send 532 an RRC Connection Reconfiguration message to the UE 102. The message can specify an NR measurement configuration so as to cause the UE 102 to measure the potential channels associated with an available 5G NR carrier, e.g., a carrier of the NR cell 122. The UE 102 can transmit 534 an RRC Connection Reconfiguration Complete message and begin to perform NR measurements.

The UE 102 can transmit 536 a Measurement Report to the eNB 104, reporting the results of NR measurement the UE 102 has performed. More specifically, the Measurement Report can include data indicative of one or more of the following: an event identity (e.g., B1 or B2), signal strength (e.g., Reference Signal Received Power (RSRP)) between the UE 102 and a base station such as the gNB 106, signal quality (e.g., Reference Signal Received Quality (RSRQ)) between the UE 102 and the base station, etc.

The eNB 104 can determine 540 to hand over the IMS video call to NR (e.g., to a 5G NR base station such as the gNB 106) in view of the NR measurement results included in the Measurement Report and the UE capability information transmitted in message 504. The eNB 104 can determine to hand over the IMS video call to NR if the signal strength and/or the signal quality included in the NR measurement results at least meet a respective threshold amount, for example. However, when the UE-EUTRA-Capability IE or the UE-EUTRA-Capability IE indicates that the UE 102 does not support IMS video over NR, the eNB 104 determines to not hand over the IMS video call of the UE 102 to an NR base station. When an UTRA cell is available, the gNB 106 in some of these cases can configure UTRA measurements, change the IMS call to a circuit-switched (CS) call, and hand the UE 102 over to the UTRA cell, depending on the capability of the UE 102.

As further illustrated in FIG. 5, the eNB 104 performs 542 a handover preparation, handover resource allocation, or forward relocation procedure and issues 550 a Mobility from EUTRA Command to the UE 102. This command includes RRC Reconfiguration information. After the UE 102 transmits 552 an RRC Reconfiguration Complete message to the gNB 106, the IMS video call continues 560 between the UE 102 and the IMS 150 (or the IMS 152) via the gNB 106.

In another scenario, the UE 102 establishes an IMS voice call, rather than a video call, with the IMS 152 via the eNB 104 and the EPC/5GC 112. In some implementations, the eNB 104 can configure the UE 102 to perform NR measurements when the UE-EUTRA-Capability IE or the UE-NR-Capability IE indicates that the UE 102 supports IMS voice over NR, and thus there is a possibility that the eNB 104 will initiate a handover of the UE 102 to a 5G NR cell while an IMS voice call is in progress. However, if the UE-EUTRA-Capability IE or the UE-NR-Capability IE indicates that the UE 102 does not support IMS voice over NR, the eNB 104 can determine that there is no need to configure the UE 102 to perform NR measurements. In other implementations, the eNB 104 does not execute the optional step 520 and configures the UE 102 to perform NR measurements regardless of the IMS voice over NR capability of the UE 102. In a similar manner, the eNB 104 can determine to hand over the IMS voice call to NR if the signal strength and/or the signal quality included in the NR measurement results at least meet a respective threshold amount. This scenario also can be implemented in a general similar manner using the techniques illustrated in FIG. 6.

Figure 6:
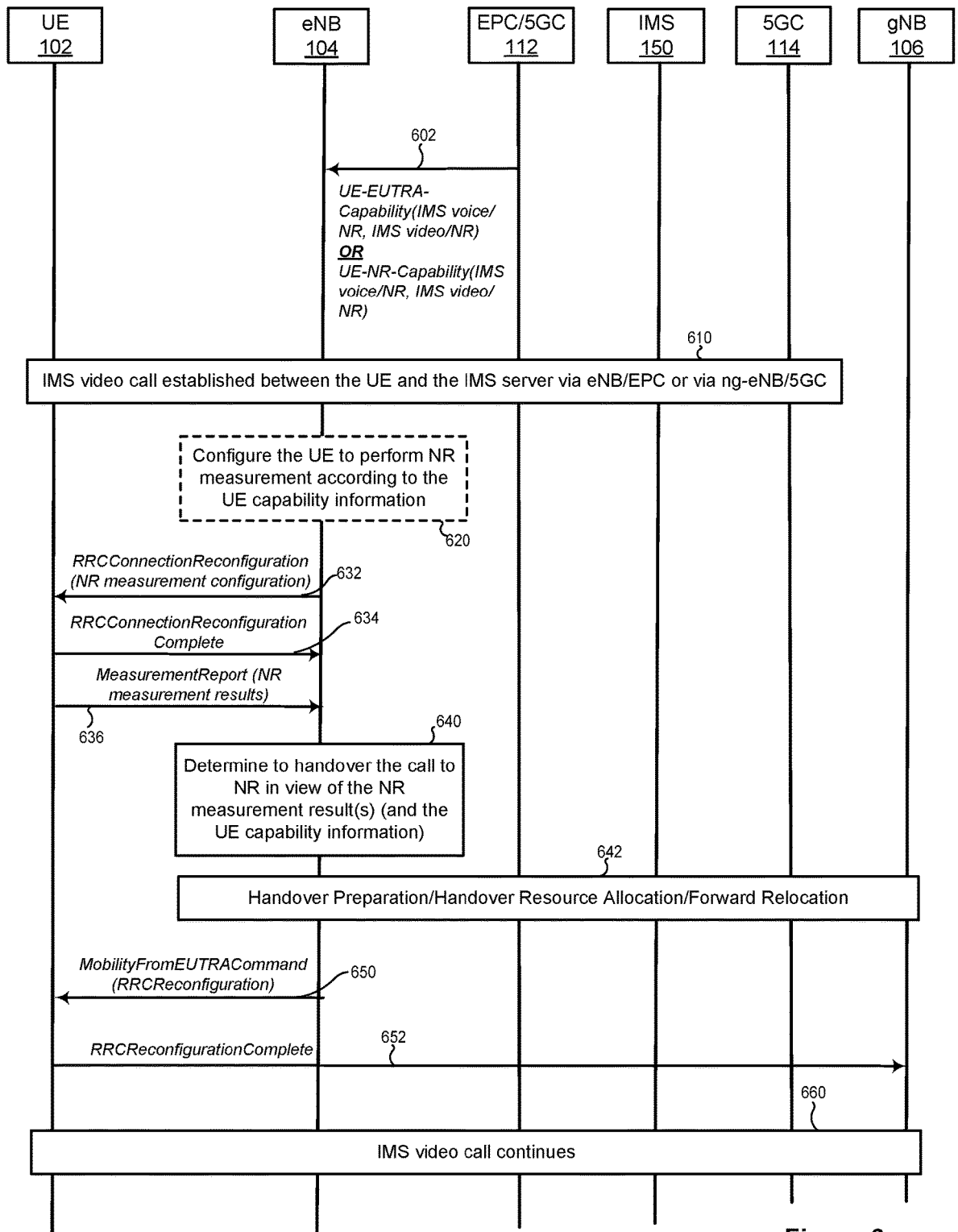

Referring now to FIG. 6, the eNB 104 in some scenarios can obtain capability information for the UE 102 from the EPC/5GC 112, which transmits 602 a UE-EUTRA-Capability IE or a UE-NR-Capability IE to the eNB 104. Similar to the scenario of FIG. 5, the IE can indicate support of IMS voice over NR and/or IMS video over NR, via one or multiple fields. The EPC/5GC 112 may have received this information indirectly from the UE 102, another base station, or another CN. The UE 102, the eNB 104, the gNB 106, and the IMS 150 then can exchange messages and execute procedures 610-660 that are similar to those discussed above with reference to FIG. 6: the UE 102 can establish 610 an IMS video call between the UE 102 and the IMS 150, similar to procedure 510; the eNB 104 can execute an optional step 620 similar to the step 520; the eNB 104 can send 632 an RRC Connection Reconfiguration message to the UE 102, receive 634 an RRC Connection Reconfiguration Complete message in response, and receive 536 a Measurement Report from the UE 102, similar to messages 532, 534, and 536, respectively; the eNB 104 can determine 640 to hand over the IMS video call to NR, similar to the determination 540 (or, when a handover to NR is not possible but an UTRA cell is available, configure UTRA measurements, change the IMS call to a CS call, and hand over to the UTRA cell, depending on the capability of the UE 102); the eNB 104 can perform a procedure 642 to the procedure 542 to prepare for a handover; the eNB 104 can issue 650 a Mobility from EUTRA Command to the UE 102 similar to issuing the command 550; the UE 102 can transmit 652 an RRC Reconfiguration Complete message to the gNB 106, similar to transmission 650; and the IMS video call can continue 660. In another scenario, the UE 102 can establish an IMS voice call with the IMS 150 via the eNB 104 and EPC/5GC 112.

Figure 7:
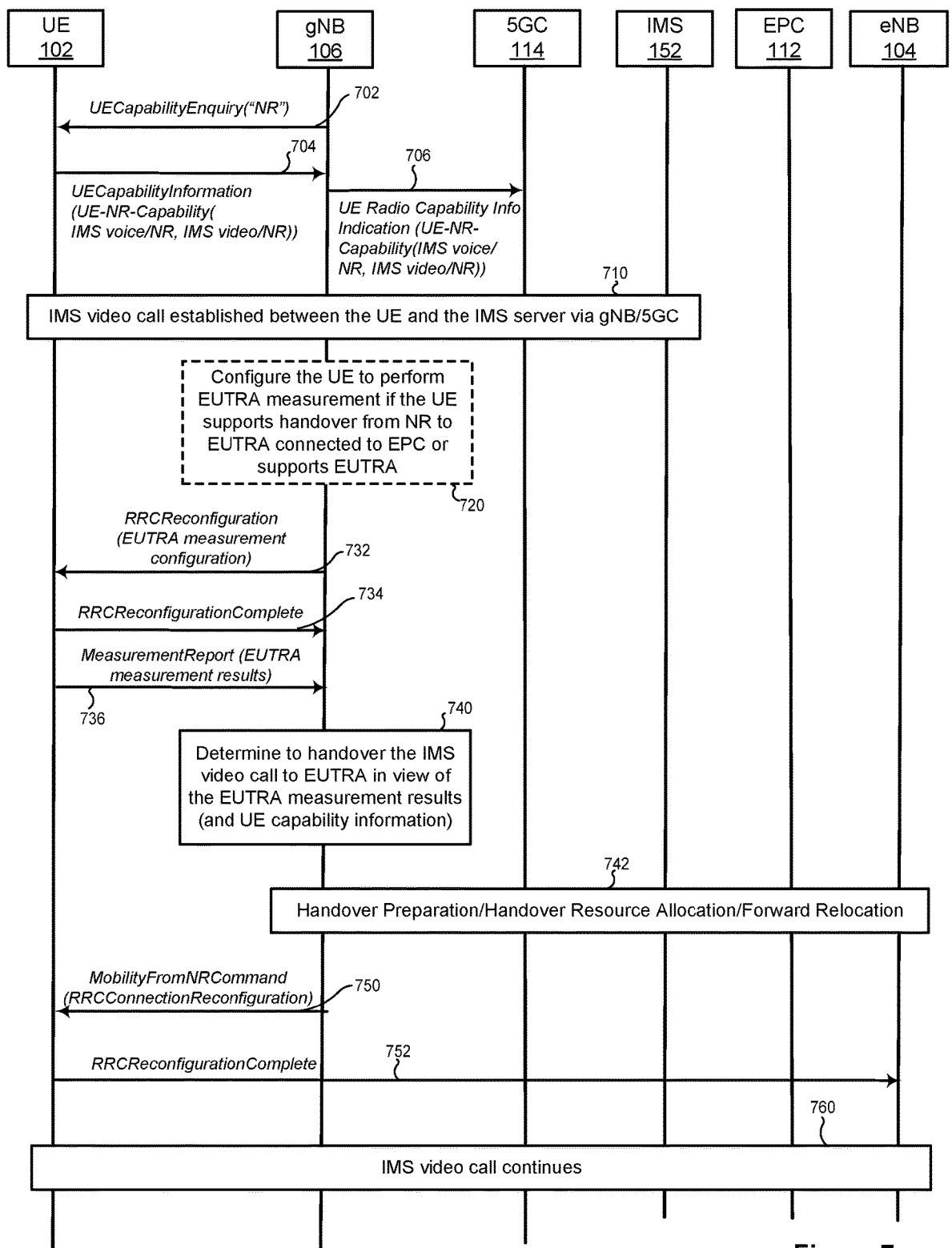

FIG. 7 illustrates an example scenario in which the gNB obtains a description of NR capabilities of the UE 102 by querying the UE 102 and coordinates a handover of an IMS video call to the eNB 104 in accordance with the obtained indication.

The gNB 106 first transmits 702 a message UECapabilityEnquiry to the UE 102 to query the UE 102 regarding its IMS call capability for NR. The UE 102 responds 704 with a UECapabilityInformation message including a UE-NR-Capability IE, which in turn can include an indication of whether the UE 102 supports IMS voice over NR and IMS video over NR. The gNB 106 then provides 706 the UE-NR-Capability IE, or another suitable IE indicating the support of IMS voice and/or video over NR at the UE 102, to the 5GC 114.

According to the approach of FIG. 7, a UE that supports IMS voice NR is mandated to support IMS voice over EUTRA/EPC, also referred to as Voice over LTE or VoLTE. Accordingly, the UE 102 does not include an NR RRC field to indicate specifically support of IMS voice over EUTRA/EPC in the UE-NR-Capability IE. Further, a UE that supports IMS video over NR is mandated to support IMS video over EUTRA/EPC or ViLTE. Accordingly, the UE 102 also omits an NR RRC field to indicate specifically support of IMS video over EUTRA/EPC in the UE-NR-Capability IE. The UE 102 thus indicates support of IMS voice over NR and IMS video over NR as discussed above, and the gNB 106 determines that the UE 102 also supports VoLTE and/or ViLTE based on the respective indications (or a single indication, when one field is used as discussed above to signal support of both IMS voice over NR and IMS video over NR).

When the UE 102 supports IMS video over NR, the UE 102 then can establish 710 an IMS video call with the IMS 152 via the gNB 106 and the 5GC 114. Similar to the optional step 520 of FIG. 5, the gNB 106 executes an optional step 720 to determine whether the UE 102 should perform EUTRA measurement, in view of the capability of the UE 102. When applicable, the gNB 106 can send 732 an RRC Reconfiguration message to the UE 102. The message can specify a EUTRA measurement configuration so as to cause the UE 102 to measure the potential channels associated with an available EUTRA carrier, e.g., a carrier of the EUTRA cell 120. The UE 102 can transmit 734 an RRC Reconfiguration Complete message and begin to perform NR measurements. The UE 102 then can transmit 736 a Measurement Report to the gNB 106, reporting a result of the EUTRA measurement the UE 102 has performed. In other implementations, the gNB 106 does not execute the optional step 720 and configures the UE 102 to perform EUTRA measurements regardless of the capability of the UE 102. More specifically, the Measurement Report can include data indicative of one or more of the following: an event identity (e.g., B1 or B2), signal strength (e.g., Reference Signal Received Power (RSRP)) between the UE 102 and a base station such as the eNB 104, signal quality (e.g., Reference Signal Received Quality (RSRQ)) between the UE 102 and the base station, etc.

The gNB 106 can determine 740 to hand over the IMS video call to EUTRA (e.g., to a EUTRA base station such as the eNB 104) in view of the EUTRA measurement results included in the Measurement Report and the UE capability information transmitted in message 704. The gNB 104 can determine to hand over the IMS video call to EUTRA if the signal strength and/or the signal quality included in the EUTRA measurement results at least meet a respective threshold amount, for example.

In another scenario, the UE 102 establishes an IMS voice call, rather than a video call, with the IMS 152 via the gNB 106 and the 5GC 114. In a similar manner, the gNB 106 can determine to hand over the IMS voice call to EUTRA if the signal strength and/or the signal quality included in the EUTRA measurement results at least meet a respective threshold amount.

The gNB 106 performs 742 a handover preparation, handover resource allocation, or forward relocation procedure and issues 7750 a Mobility from NR Command to the UE 102. This command includes an RRC Connection Reconfiguration message. After the UE 102 transmits 752 an RRC Reconfiguration Complete message to the eNB 104 in response to the Mobility from NR Command or RRC Connection Reconfiguration message, the IMS video call or ViLTE continues 760 between the UE 102 and the IMS 152 (or another IMS) via the eNB 104. Alternatively, when the UE 102 has established an IMS voice call over NR during the procedure 710, an IMS voice call or VoLTE continues 760 between the UE 102 and the IMS via the eNB 104.

Figure 8:
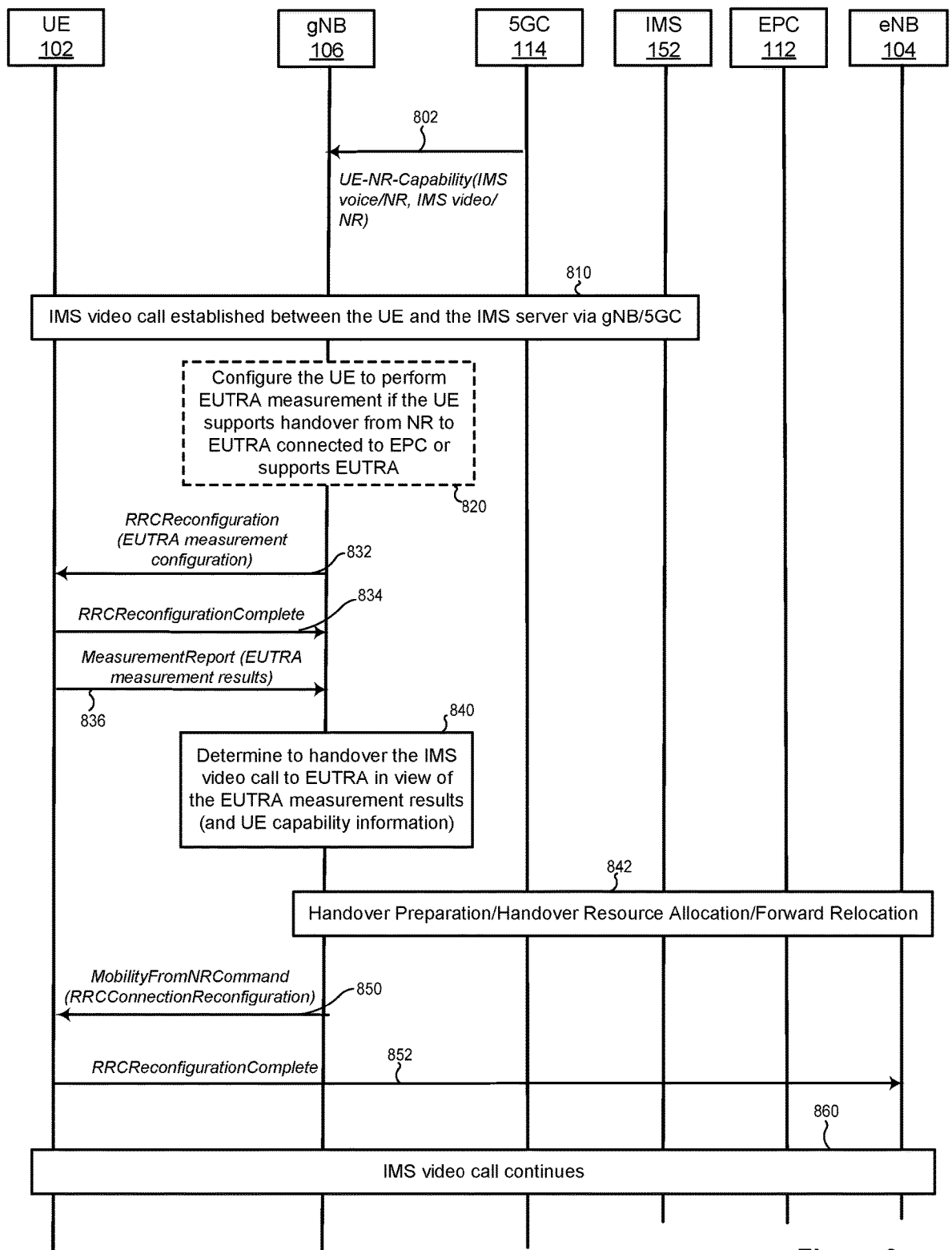

FIG. 8 illustrates a generally similar scenario to that of FIG. 7, but the gNB 106 receives the UE-NR-Capability IE indicating support of IMS voice over NR and IMS video over NR from the 5GC 114. Similar to the scenario of FIG. 7, the gNB 106 determines, in accordance with the relevant requirement, that a UE supporting IMS voice over NR also supports VoLTE, and an UE supporting IMS video over NR also supports ViLTE.

The UE 102, the gNB 106, the eNB 104, and the IMS 152 then can exchange messages and execute procedures 810-860 that are similar to those discussed above with reference to FIG. 7: the UE 102 can establish 810 an IMS video call between the UE 102 and the IMS 152; the gNB 106 can execute an optional step 820 similar to the step 720; the gNB 106 can send 832 an RRC Reconfiguration message to the UE 102, receive 834 an RRC Reconfiguration Complete message in response, and receive 836 a Measurement Report from the UE 102; the gNB 105 can determine 840 to hand over the IMS video call to EUTRA; the gNB 106 can perform a procedure 842 to prepare for a handover; the gNB 106 can issue 850 a Mobility from NR Command to the UE 102; the UE 102 can transmit 852 an RRC Connection Reconfiguration Complete message to the eNB 104; and the IMS video call can continue 660. Alternatively, when the UE 102 has established an IMS voice call over NR during the procedure 810, an IMS voice call or VoLTE continues 860 between the UE 102 and the IMS via the eNB 104 in a similar manner as described for the IMS video call.

Figure 9:
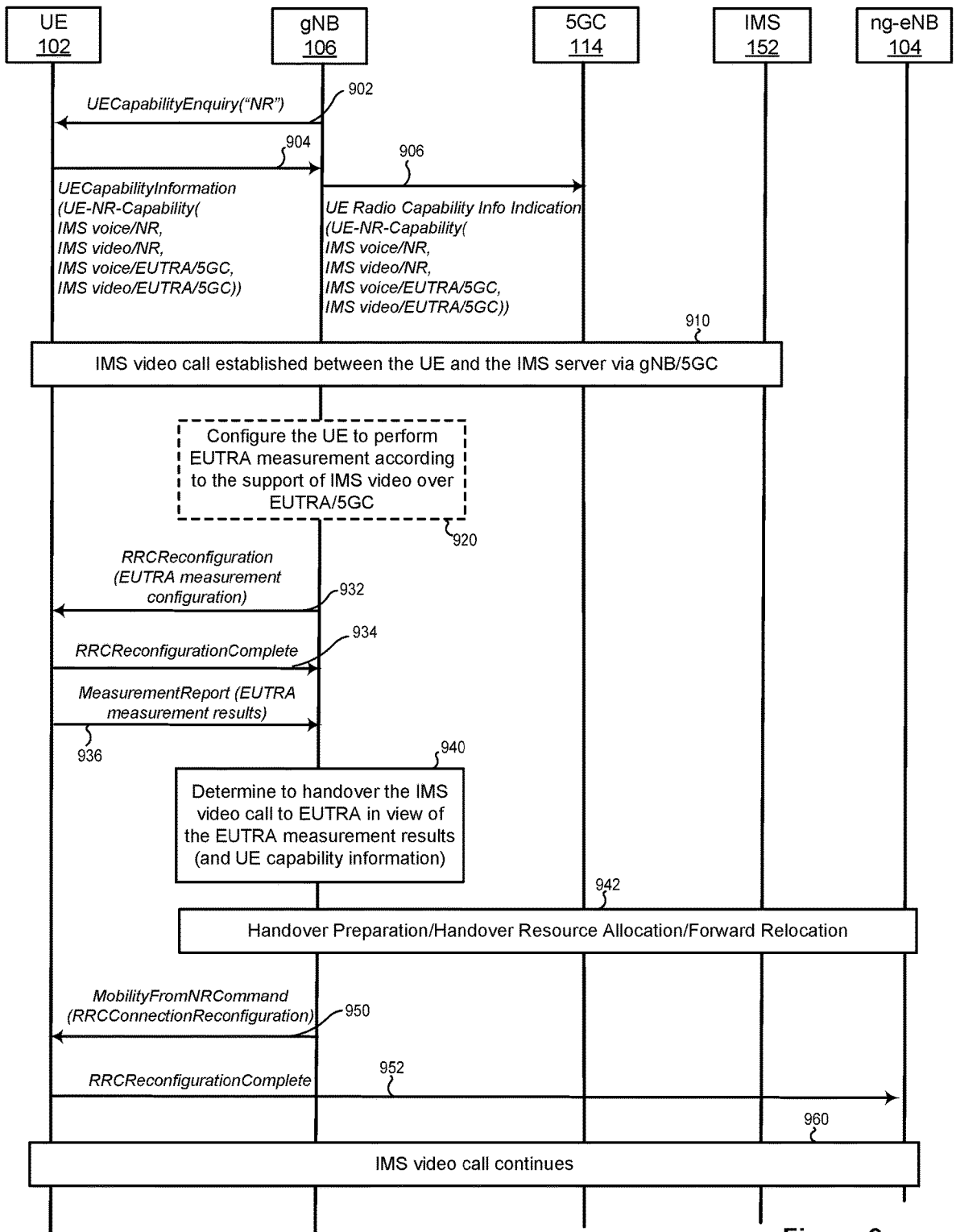

Next, FIG. 9 illustrates an example scenario in which the gNB 106 obtains an indication of NR and EUTRA capabilities of the UE 102 by querying the UE 102 regarding its NR capabilities, and coordinates a handover of an IMS video call to the eNB 104 in accordance with the obtained indication. The gNB 106 transmits 902 a message UECapabilityEnquiry to the UE 102 and specifies "NR" as a parameter.

The UE 102 in this implementation transmits 904 a UECapabilityInformation message and includes, in the UE-NR-Capability IE, a first NR RRC field indicating support of IMS voice over NR, a second NR RRC field indicating support of IMS video over NR, a third NR RRC field indicating support of IMS voice over EUTRA/5GC, and a fourth NR RRC field indicating support of IMS video over EUTRA/5GC. In an implementation, the indications of IMS voice over EUTRA/5GC and IMS video over EUTRA/5GC are encoded using the NR RRC ASN.1 format, and accordingly the gNB 106 can correctly determining the meaning of these parameters. Further, the UE-NR-Capability IE in some cases includes an NR RRC field to indicate support of handover to EUTRA/5GC. The gNB 106 then provides 906 this information to the 5GC 114, using the same UE-NR-Capability IE or another suitable IE.

The UE 102, the gNB 106, the eNB 104, and the IMS 152 then can exchange messages and execute procedures 910-960 that are similar to those discussed above with reference to FIGS. 7 and 8: the UE 102 can establish 910 an IMS video call between the UE 102 and the IMS 152; the gNB 106 can execute an optional step 920 similar to the step 720; the gNB 106 can send 932 an RRC Reconfiguration message to the UE 102, receive 934 an RRC Reconfiguration Complete message in response, and receive 936 a Measurement Report from the UE 102; the gNB 105 can determine 940 to hand over the IMS video call to EUTRA; the gNB 106 can perform a procedure 942 to prepare for a handover; the gNB 106 can issue 950 a Mobility from NR Command to the UE 102; the UE 102 can transmit 952 an RRC Connection Reconfiguration Complete message to the eNB 104; and the IMS video call can continue 960. Alternatively, when the UE 102 has established an IMS voice call over NR during the procedure 910, an IMS voice call continues 960 between the UE 102 and the IMS via the eNB 104 in a similar manner as described above for the IMS video call.

Figure 10:
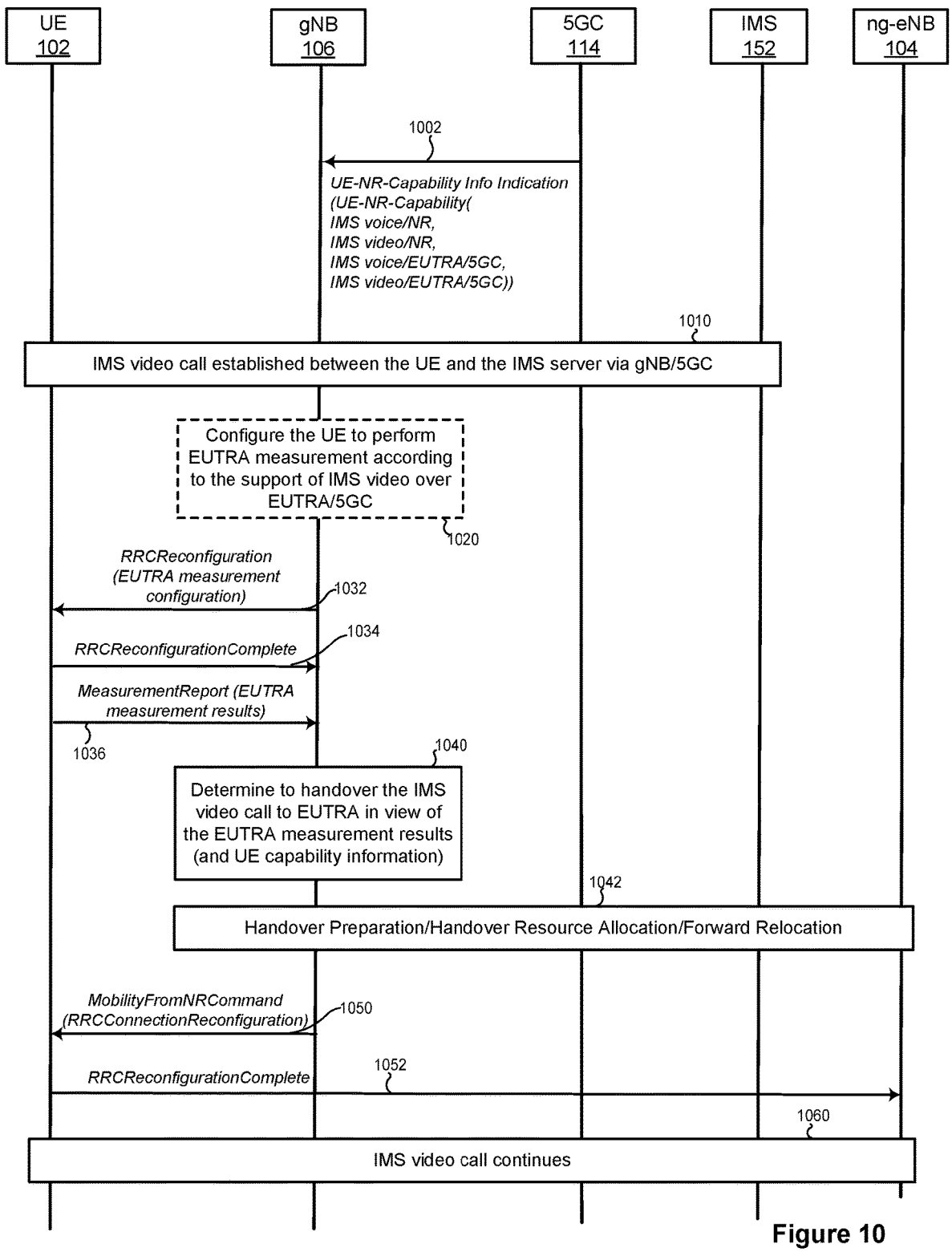

The scenario of FIG. 10 is generally similar to the scenario of FIG. 9, but the gNB 106 receives 1002 the UE-NR-Capability IE from the 5GC 114. The UE-NR-Capability IE in this scenario includes IMS voice over NR, IMS video over NR, IMS voice over EUTRA/5GC, and IMS video over EUTRA/5GC fields.

The UE 102, the gNB 106, the eNB 104, and the IMS 152 then can exchange messages and execute procedures 1010-1060 that are similar to those discussed above with reference to FIGS. 7-9: the UE 102 can establish 1010 an IMS video call between the UE 102 and the IMS 152; the gNB 106 can execute an optional step 1020 similar to the step 720; the gNB 106 can send 1032 an RRC Reconfiguration message to the UE 102, receive 1034 an RRC Reconfiguration Complete message in response, and receive 1036 a Measurement Report from the UE 102; the gNB 105 can determine 1040 to hand over the IMS video call to EUTRA; the gNB 106 can perform a procedure 1042 to prepare for a handover; the gNB 106 can issue 1050 a Mobility from NR Command to the UE 102; the UE 102 can transmit 1052 an RRC Connection Reconfiguration Complete message to the eNB 104; and the IMS video call can continue 1060.

Alternatively, when the UE 102 has established an IMS voice call over NR during the procedure 1010, an IMS voice call continues 1060 between the UE 102 and the IMS via the eNB 104 in a similar manner as described above for the IMS video call.

FIGS. 11-14 illustrate several example scenarios in which a base station provides an indication of support of IMS voice over NR, IMS video over NR, etc. to a CN. As discussed above, the CN then can provide an indication of support of these features to a base station.

Figure 13:
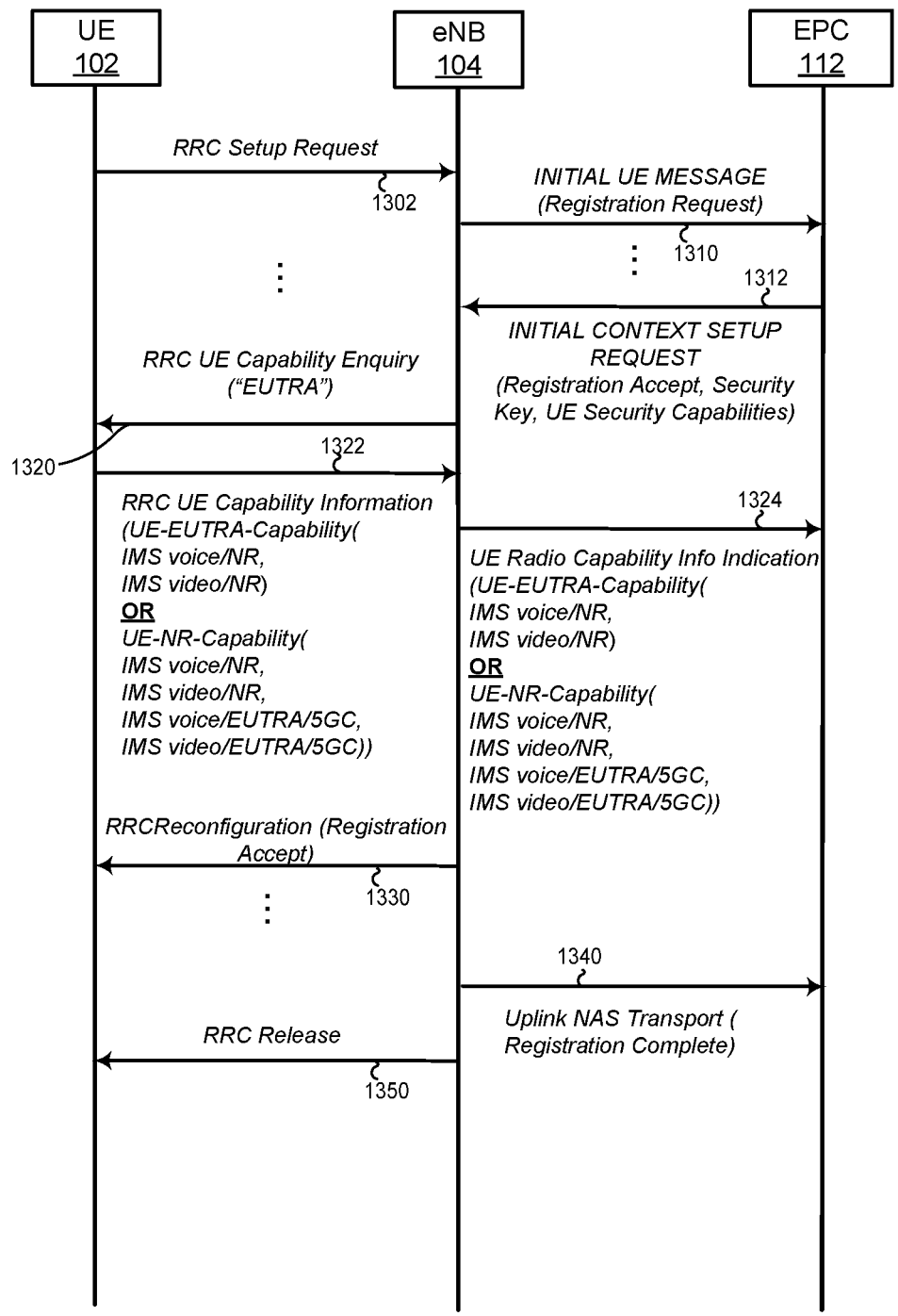
Figure 14:
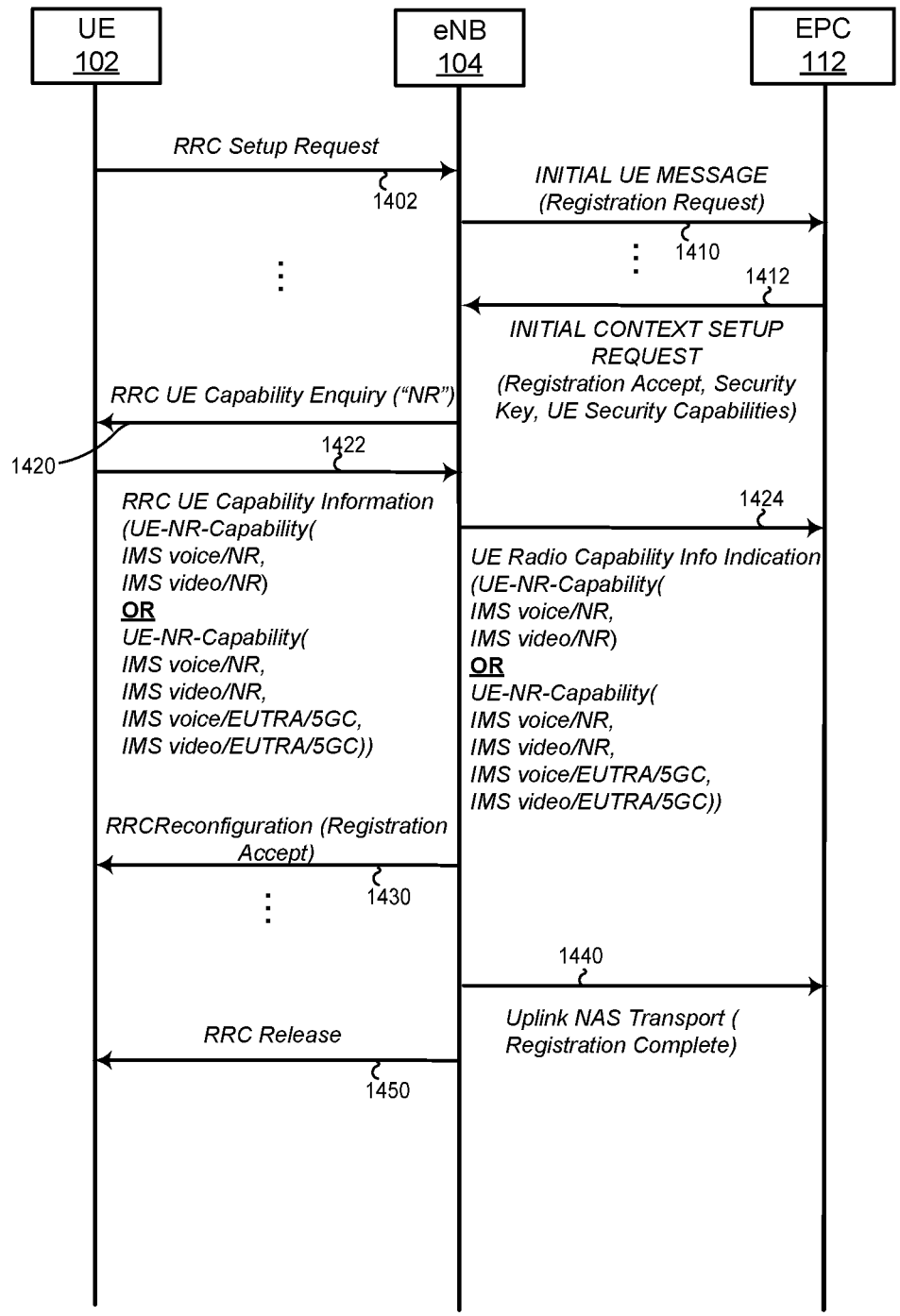

In these scenarios, the UE 102 initially operates in the RRC_IDLE state and transmits 1102, 1202, 1302, or 1402 an RRC Setup Request to the gNB 106 or the ng-eNB 104 (FIGS. 11 and 12) or the eNB 104 (FIGS. 13 and 14), which in turn transmits 1110, 1210, 1310, or 1410 an Initial UE Message to the 5GC 114 (FIGS. 11 and 12) or the EPC 112. FIGS. 11-14 omit certain messages for simplicity and illustrate that the 5GC 114 or the EPC 112 transmits 1112, 1212, 1312, or 1412 Initial Context Setup Request message to the gNB 106 or the ng-eNB 104 (FIGS. 11 and 12) or the eNB 104 (FIGS. 13 and 14). The gNB 106/the ng-eNB 104 or the eNB 104 transmits 1120, 1220, 1320, or 1420 a UECapabilityEnquiry message to the UE 102, and the UE 102 responds 1122, 1222, 1322, or 1422 with a UECapabilityInformation message.

The UECapabilityInformation in various implementations can indicate support of IMS voice over NR and IMS video over NR in one example case, and indicate support of IMS voice over NR, IMS video over NR, IMS voice over EUTRA/5GC, and IMS video over EUTRA/5GC in another example case. The gNB 106 or the ng-eNB 104 (FIGS. 11 and 12) or the eNB 104 (FIGS. 13 and 14) then transmits 1124, 1224, 1324, or 1424 a UECapabilityInfoIndication message to the 5GC 114 (FIGS. 11 and 12) or the EPC 112 (FIGS. 13 and 14) and transmits 1130, 1230, 1330, of 1430 a message to the UE 102 to indicate that the registration has been accepted. The gNB 106 or the ng-eNB 104 (FIGS. 11 and 12) or the eNB 104 (FIGS. 13 and 14) indicates 1140, 1240, 1340, or 1440 to the 5GC 114 (FIGS. 11 and 12) or the EPC 112 (FIGS. 13 and 14) that the registration has been completed via an Uplink NAS Transport message, and releases 1150, 1250, 1350, or 1450 the RRC connection between the UE 102 and the gNB 106/the ng-eNB 104 or the eNB 104.

Figure 11:
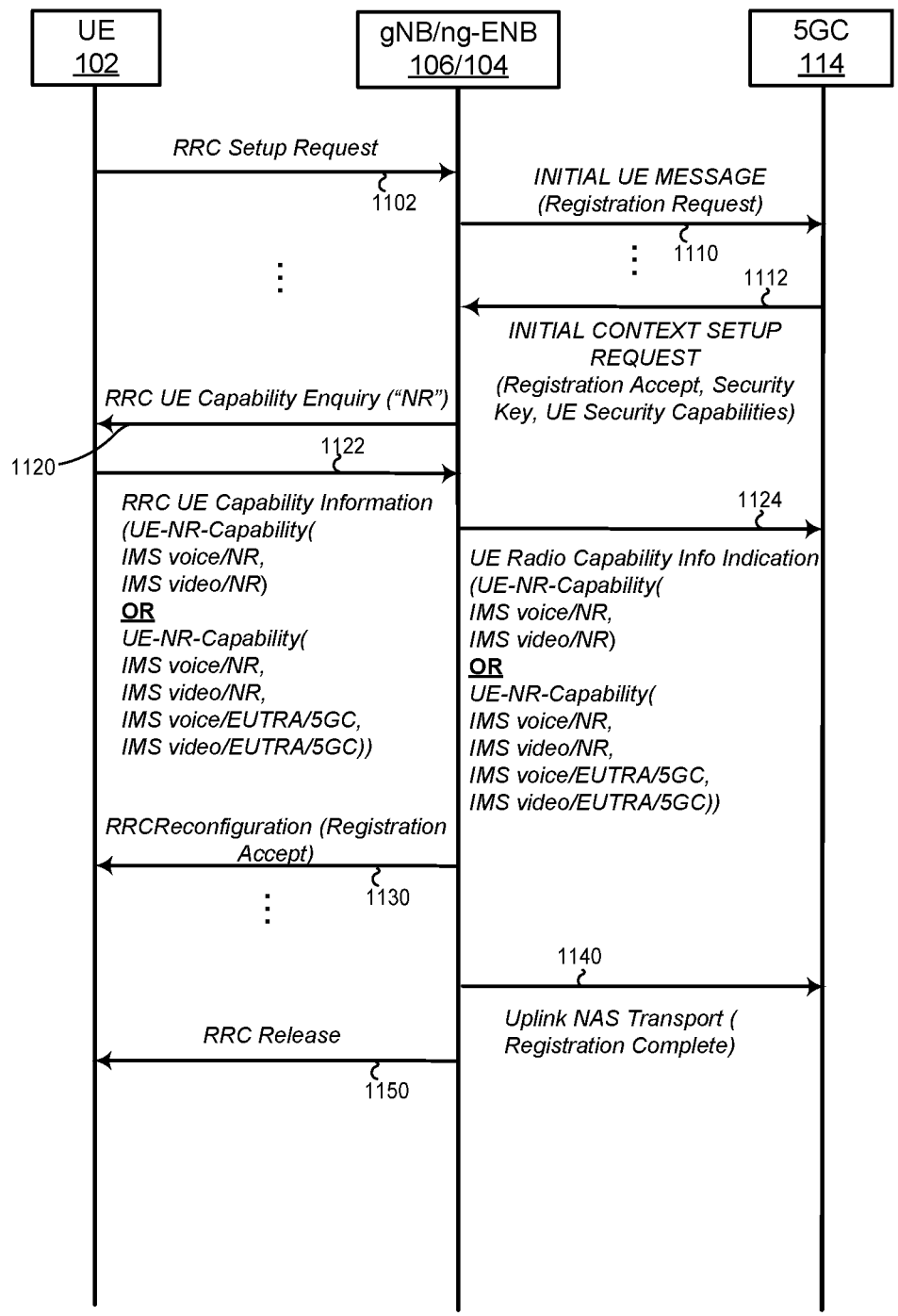

Referring specifically to FIG. 11, the gNB 106 or the ng-eNB 104 in this scenario obtains an indication of NR, or NR and EUTRA, capabilities of the UE 102 by querying the user device regarding its NR capabilities, and provides a corresponding indication to the 5GC 114 during a registration procedure between the UE 102 and the 5GC 114. In this scenario, the UE 102 may initiate an IMS registration procedure with the IMS 152 before receiving 1150 the RRC Release message or after receiving 1150 the RRC Release message. Upon initiating the IMS registration procedure, the UE 102 can transmit a SIP message to the IMS 152 via the gNB 106 and the 5GC 114 or ng-eNB 104 and the 5GC 114.

Figure 12:
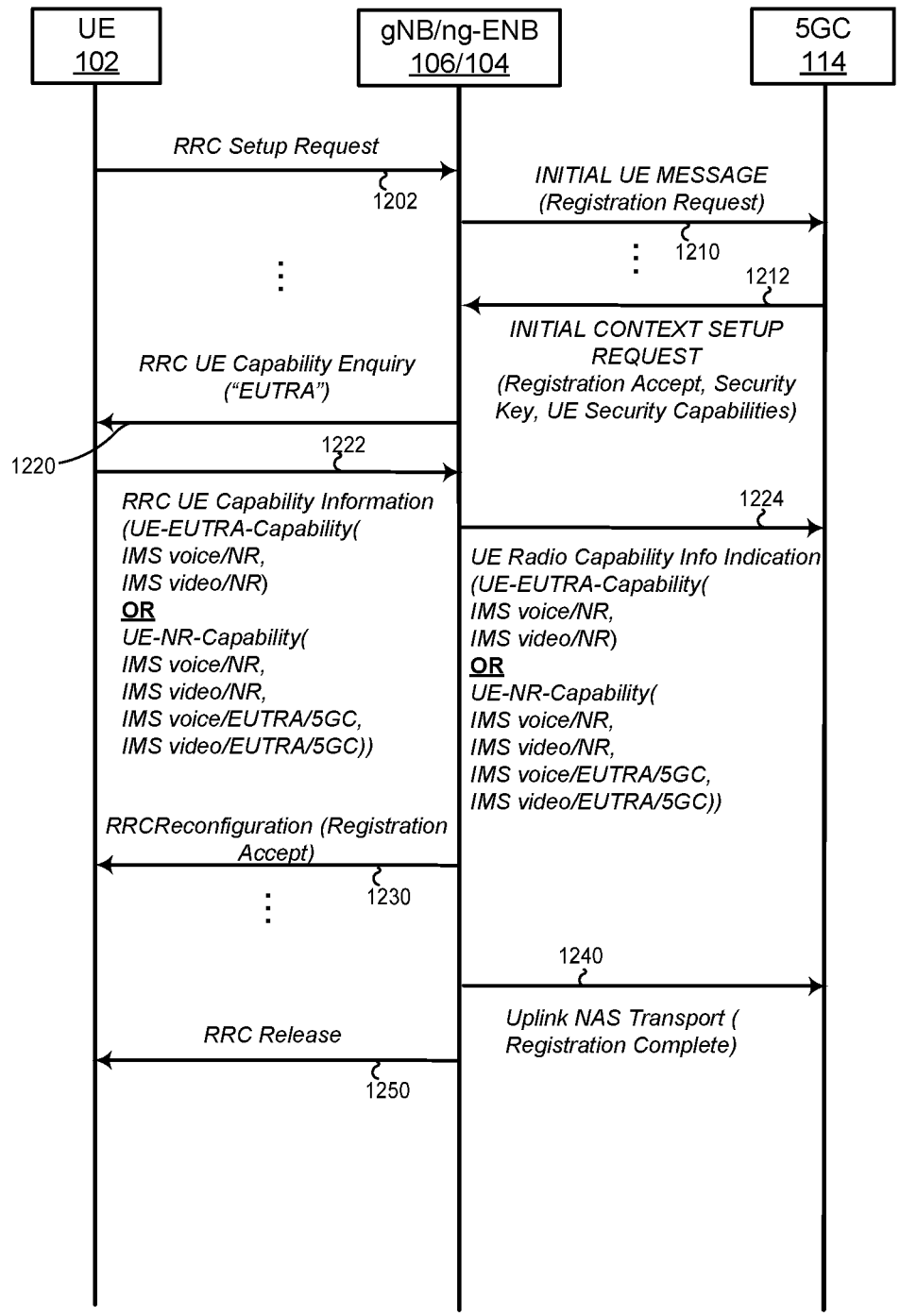

In the scenario of FIG. 12, the gNB 106 or the ng-eNB 104 queries 1220 the UE 102 regarding its EUTRA capability rather than its NR capability, during the registration procedure between the UE 102 and the 5GC 114. Further, in some implementations, the gNB 106 or the ng-eNB 104 can combine the query 1220 with the query 1120 of FIG. 11 in a single UECapabilityEnquiry message, so as to query the UE 102 regarding both its EUTRA and NR capabilities at the same time. Similarly, the UE 102 can combine responses 1222 and 1122 and provide indications of both EUTRA and NR capabilities in a single UECapabilityInformation message.

In the scenario of FIG. 13, the eNB 104 obtains an indication of EUTRA and NR capabilities of the UE by querying the UE 102 regarding its EUTRA capabilities and provides a corresponding indication to the EPC 112; and in the scenario of FIG. 14, the eNB 104 obtains an indication of NR and EUTRA capabilities of the UE by querying the UE 102 regarding its NR capabilities and provides a corresponding indication to the EPC 112. In some implementations, the eNB 104 can combine the query 1420 with the query 1320 in a single UECapabilityEnquiry message, so as to query the UE 102 regarding both its EUTRA and NR capabilities at the same time. Similarly, the UE 102 can combine responses 1322 and 1422 and provide indications of both EUTRA and NR capabilities in a single UECapabilityInformation message.

FIGS. 15-22 illustrate flow diagrams of several example methods that can be implemented in the UE 102, the eNB 104, or the gNB 106. These methods can be implemented as respective sets of software instructions and executed on the processing hardware of the corresponding device. Although the discussion below pertains primarily to the UE 102, the eNB 104, or the gNB 106, these methods in general can be implemented in any suitable user device or a base station. Further, although these examples refer to particular RATs such as EUTRA and NR, particular CN types such as EPC and 5GC, and particular types of packet-based calls such as IMS voice and IMS video, these techniques also can apply to other RATs, CN types, or types of packet-based calls.

Figure 15:
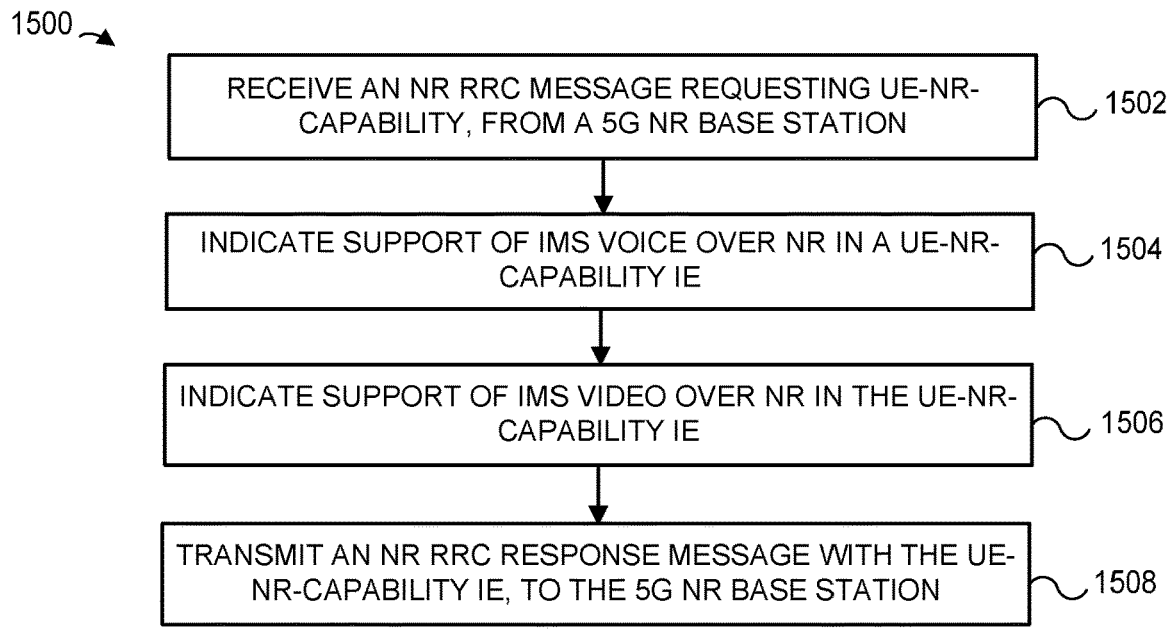

Referring first to FIG. 15, an example method 1500 for transmitting an indication of support, or lack of support, of IMS video over NR can be implemented in the UE 102, for example. The method 1500 begins at block 1502, where the UE 102 receives an NR RRC message requesting UE-NR-Capability, from the gNB 106 (e.g., message 304 of FIG. 3). At block 1504, the UE 102 indicates support of IMS voice over NR in a UE-NR-Capability IE, and further indicates support of IMS video over NR in the UE-NR-Capability IE at block 1506. As discussed above, the UE 102 can use separate fields or a shared field to indicate support, or lack of support, of IMS voice over NR and IMS video over NR. The UE 102 transmits an NR RRC Response message with the UE-NR-Capability IE to the gNB 106 at block 1508 (e.g., message 306 of FIG. 3).

Figure 16:
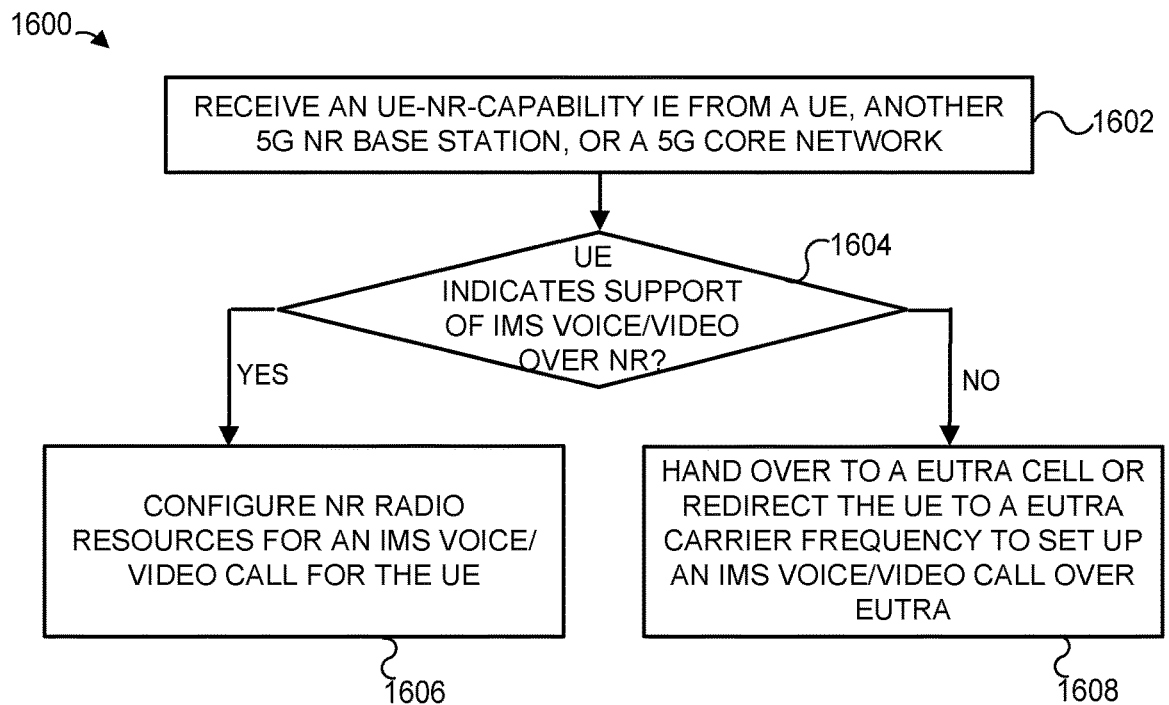

FIG. 16 illustrates an example method 1600 in the gNB 106 for obtaining NR capability indicating support, or lack of support, of IMS video over NR from the UE 102. At block 1602, the gNB 106 receives UE-NR-Capability from the UE 102 (e.g., message 306 of FIG. 3), another 5G NR base station, or the 5GC 114 (e.g., message 412 of FIG. 3). The gNB 106 determines, at block 1604, whether the UE 102 has indicated support of IMS voice and/or IMS video over NR (e.g., block 320 of FIG. 3, block 420 of FIG. 4).

When the gNB 106 determines that the UE 102 supports IMS voice and/or video calls over NR, the flow proceeds to block 1606, where the gNB 106 configures NR radio resources for an IMS voice call over NR or an IMS vide call over NR, depending on the type of an IMS call the UE 102 is initiating or receiving (e.g., message 330 of FIG. 3, message 430 of FIG. 4). In particular, the gNB 106 can configure two DRBs, one or voice and one or for video, for an IMS video call. The UE 102 and the gNB 106 then can communicate IMS voice packets of the IMS video call over the first DRB and IMS video packets of the IMS video call over the second DRB (e.g., procedure 340 of FIG. 3, procedure 440 of FIG. 4).

On the other hand, when the gNB 106 determines that the UE 102 does not support IMS voice and/or video calls over NR, the flow proceeds to block 1608. The gNB 106 at block 1608 hands over the call to a EUTRA cell (e.g., the cell 120 of FIG. 1) or redirects the UE 102 to a EUTRA carrier, so that the UE 102 can set up an IMS voice or video call over EUTRA.

Further, in one implementation, the 5GC 114 may request that the gNB 106 derive and provide indications to the 5GC 114 regarding whether the radio capabilities of the UE 102 are compatible with the network configuration for IMS voice and video. To this end, the gNB may conduct a UE Radio Capability Check procedure. During this procedure, the gNB 106 can receive, from the 5GC 114, a UE Radio Capability Check Request message for the UE 102. If the gNB 106 has determined at block 1604 that the UE 102 supports IMS voice over NR, the gNB 106 can include an IMS voice support indicator in the UE Radio Capability Check Response message and transmit this message to the 5GC 114. If the gNB 106 has determined at block 1604 that the UE 102 does not support IMS voice over NR, the gNB 106 can omit the IMS voice support indicator from the UE Radio Capability Check Response message. Similarly, if the gNB 106 has determined at block 1604 that the UE 102 supports IMS video over NR, the gNB 106 can include an IMS video support indicator in the UE Radio Capability Check Response message; otherwise, if the UE 102 does not support IMS video over NR, the gNB 106 can omit the IMS video support indicator from the UE Radio Capability Check Response message. The 5GC 114 in some implementations can be equipped with a NR RRC decoder and determine whether the UE 102 supports IMS voice over NR and/or IMS video over NR by decoding the UE-NR-Capability IE the UE 102 transmitted to the gNB 106.

Figure 17:
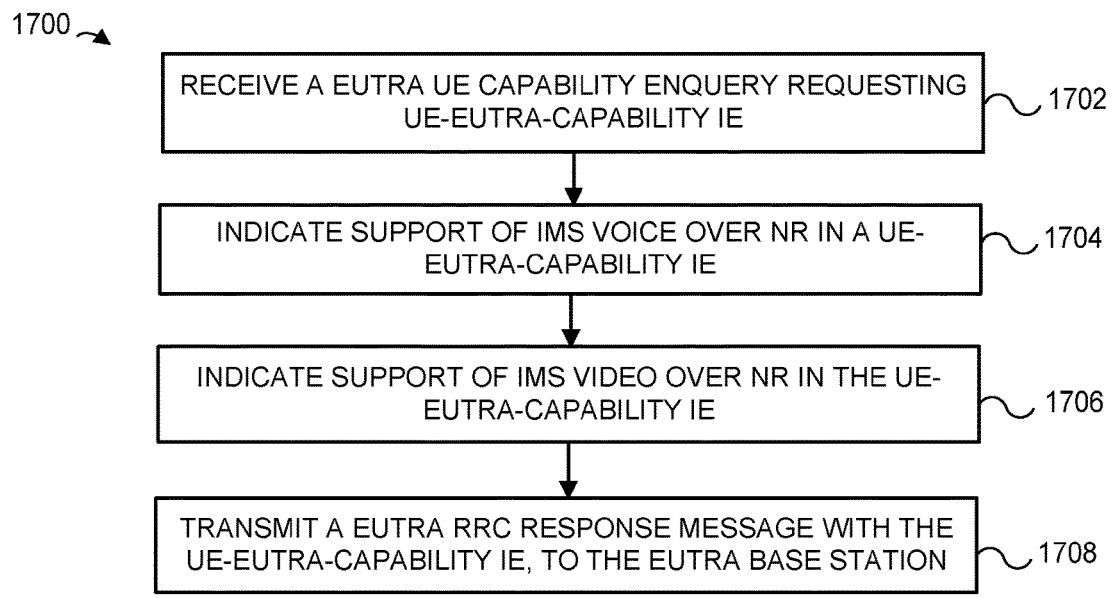

FIG. 17 illustrates an example method 1700 that can be implemented in the UE 102 for transmitting an indication that the user device supports IMS video over NR in response to a query pertaining to EUTRA capabilities. The method 1700 begins at block 1702, where the UE 102 receives an NR RRC message requesting UE-EUTRA-Capability, from the eNB 104 (e.g., message 502 of FIG. 5). At block 1704, the UE 102 indicates support of IMS voice over NR in a UE-EUTRA-Capability IE, and further indicates support of IMS video over NR in the UE-EUTRA-Capability IE at block 1706. The UE 102 transmits a EUTRA RRC Response message with the UE-EUTRA-Capability IE to the eNB 104 at block 1708 (e.g., message 504 of FIG. 5).

As discussed above, the UE 102 can use separate fields or a shared field to indicate support, or lack of support, of IMS voice over NR and IMS video over NR. Moreover, the UE 102 in some cases includes, in the UE-EUTRA-Capability IE, another EUTRA RRC field indicating support of NR standalone mode or indicating support of handover to NR. In another example implementation, the UE 102 does not include this field when the UE 102 indicates support of IMS voice over NR and/or IMS video over NR.

Further, the UE 102 in some cases can include NR band information (e.g., in a EUTRA RRC field encoded according to the EUTRA RRC ASN.1 format) in the UE-EUTRA-Capability IE. The NR band information can include NR band number(s) identifying one or more bands the UE 102 supports.

Thus, according to one scenario, the UE 102 has established an IMS voice call via the eNB 104. The eNB 104 configures the UE 102 to measure the NR carrier frequency according to the NR band information (also see discussion of messages 532-536 in FIG. 5, messages 632-636 in FIG. 6, etc.). The eNB 104 transmits to the UE 102 a measurement configuration including an NR absolute radio frequency channel number (ARFCN) identifying the NR carrier frequency. The UE 102 measures the NR carrier frequency and transmits NR measurement result(s) to the eNB 104, according to the measurement configuration. The NR measurement result(s) may include at least one of an event identity (e.g. B1 or B2), signal strength (e.g. Reference Signal Received Power (RSRP)) and signal quality (e.g. Reference Signal Received Quality (RSRQ)). The eNB 104 determines to hand over the UE 102 to the gNB 106 according to the NR measurement result(s) and the EUTRA RRC field indicating support of IMS voice over NR (or the single RRC field indicating support of IMS voice over NR as well as IMS video over NR).

According to another example scenario, the UE 102 has established an IMS video call via the eNB 104. The eNB 104 configures the UE 102 to measure a NR carrier frequency according to the NR band information, similar to the example discussed above. The eNB 104 conducts the one or more measurements and provides the one or more NR measurement results to the eNB 104, also similar to the discussion above. The eNB determines to hand over the UE 102 to the gNB 106 according to the NR measurement result(s) and the EUTRA RRC field indicating support of IMS video over NR (or the single RRC field indicating support of IMS voice over NR as well as IMS video over NR).

Figure 18:
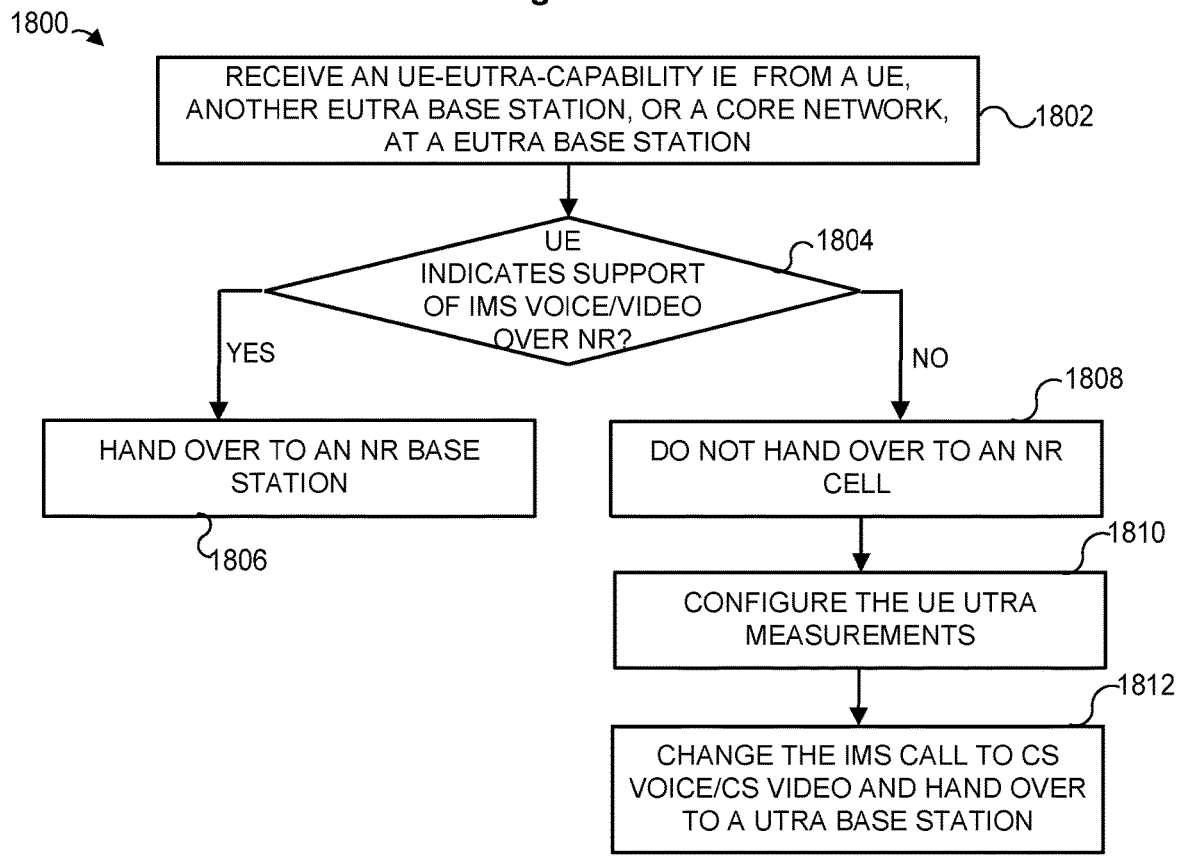

FIG. 18 is a flow diagram of an example method 1800 in the eNB 104 for obtaining EUTRA capability of the UE 102, indicating IMS video over NR support from the user device and accordingly handing over the user device to the gNB 106 or changing the type of the call. The method 1800 begins at block 1802, where the eNB 104 receives UE-EUTRA-Capability from the UE 102 (e.g., message 504 of FIG. 5), another EUTRA base station, or the EPC 112 (e.g., message 602 of FIG. 6). The eNB 104 determines, at block 1804, whether the UE 102 has indicated support of IMS voice over NR and/or IMS video over NR (e.g., procedure 540 of FIG. 5 or procedure 640 of FIG. 6).

If the UE 102 has indicated support of IMS voice over NR and/or IMS video over NR, the eNB 104 can hand over the UE 102 to an NR base station, such as the gNB 106, at block 1806 (e.g., procedure 542 and message 550 of FIG. 5 or procedure 642 and message 650 of FIG. 6). Otherwise, the eNB 104 can determine that it should not hand over to a 5G NR station (block 1808). Instead, the eNB 104 can configure the UE 102 to perform UTRA measurements at block 1810, if the UE-EUTRA-Capability IE indicates that the UE 102 supports UTRA. The eNB 104 can receive one or more UTRA measurement results from the UE 102. The eNB 104 then at block 1812 can change the IMS voice call to CS voice call and configure the UE 102 to hand over to an UTRA base station (e.g., by transmitting a Mobility From EUTRA Command to the UE 102). In another scenario, the eNB 104 at block 1812 can change the IMS video call to a circuit-switched (CS) video call and configure the UE 102 to hand over to an UTRA base station.

Figure 19:
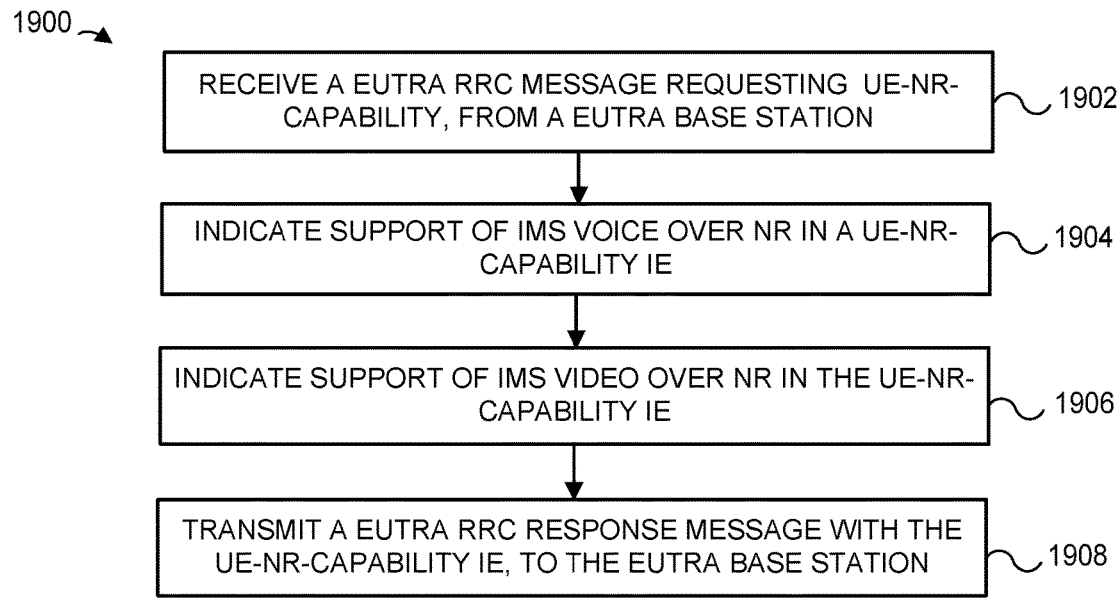

FIG. 19 is a flow diagram of an example method 1900 for transmitting an indication that the user device supports IMS video over NR to the EUTRA base station in a response to a query regarding NR capabilities of the user device, which can be implemented in the UE 102. The method 1900 begins at block 1902, where the UE 102 receives an NR RRC message requesting UE-NR-Capability, from the eNB 104 (e.g., message 502 of FIG. 5). At block 1904, the UE 102 indicates support of IMS voice over NR in a UE-NR-Capability IE, and further indicates support of IMS video over NR in the UE-NR-Capability IE at block 1906. The UE 102 transmits a EUTRA RRC Response message with the UE-NR-Capability IE to the eNB 104 at block 1908 (e.g., message 504 of FIG. 5).

Figure 20:
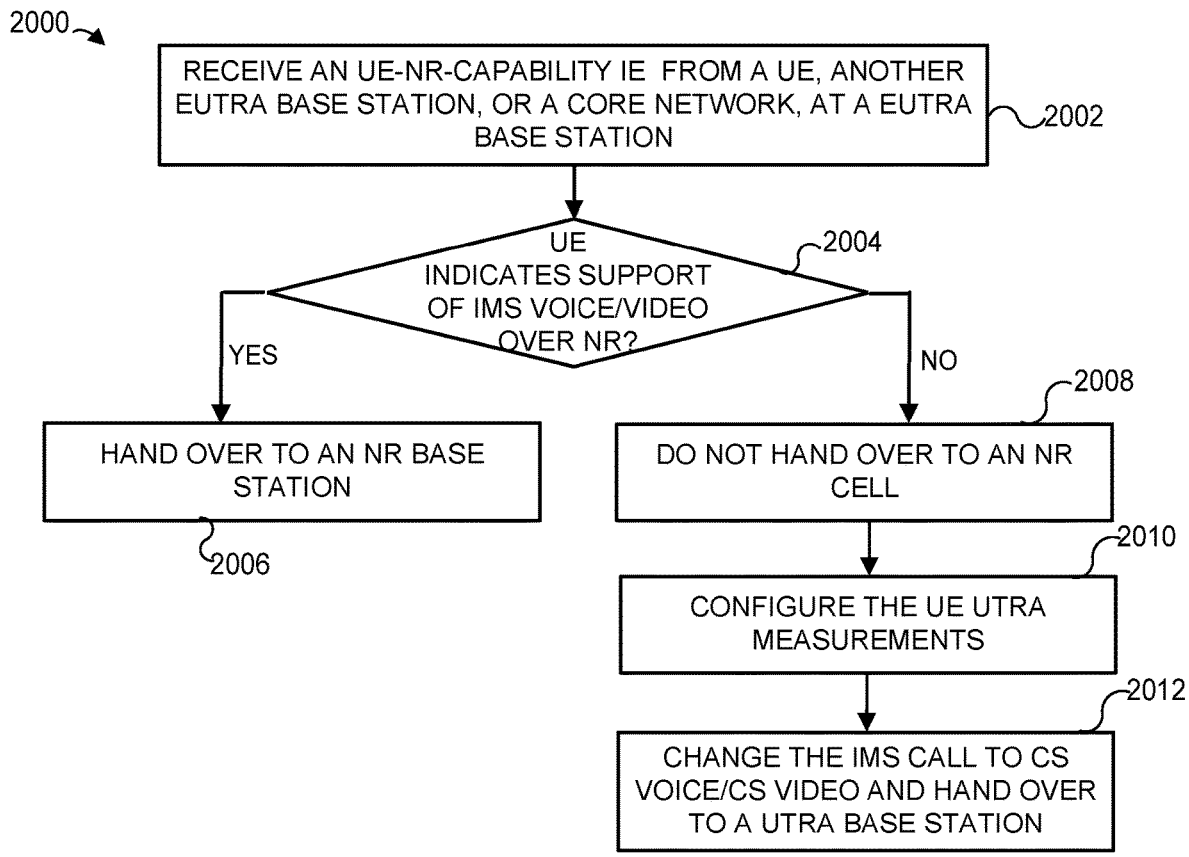

Next, FIG. 20 illustrates an example method 2000 in the eNB 104 for obtaining NR capability indicating IMS video over NR support from UE 102 and, in accordance with the obtained capability, handing over the UE 102 to the gNB 106 or changing the type of the call. In particular, the eNB 104 receives UE-NR-Capability from the UE 102 (e.g., message 504 of FIG. 5 or message 602 of FIG. 6), another EUTRA base station, or the EPC 112. The eNB 104 determines, at block 2004, whether the UE 102 has indicated support of IMS voice over NR and/or IMS video over NR (e.g., procedure 540 of FIG. 5 or procedure 640 of FIG. 6). If the UE 102 has indicated support of IMS voice over NR and/or IMS video over NR, the eNB 104 can hand over the UE 102 to an NR base station, such as the gNB 106, at block 2006 (e.g., procedure 542 and message 550 of FIG. 5 or procedure 642 and message 650 of FIG. 6). Otherwise, the eNB 104 can execute the functions of blocks 2008-2012, which are similar to blocks 1808-1812 discussed above with reference to FIG. 18.

Figure 21:
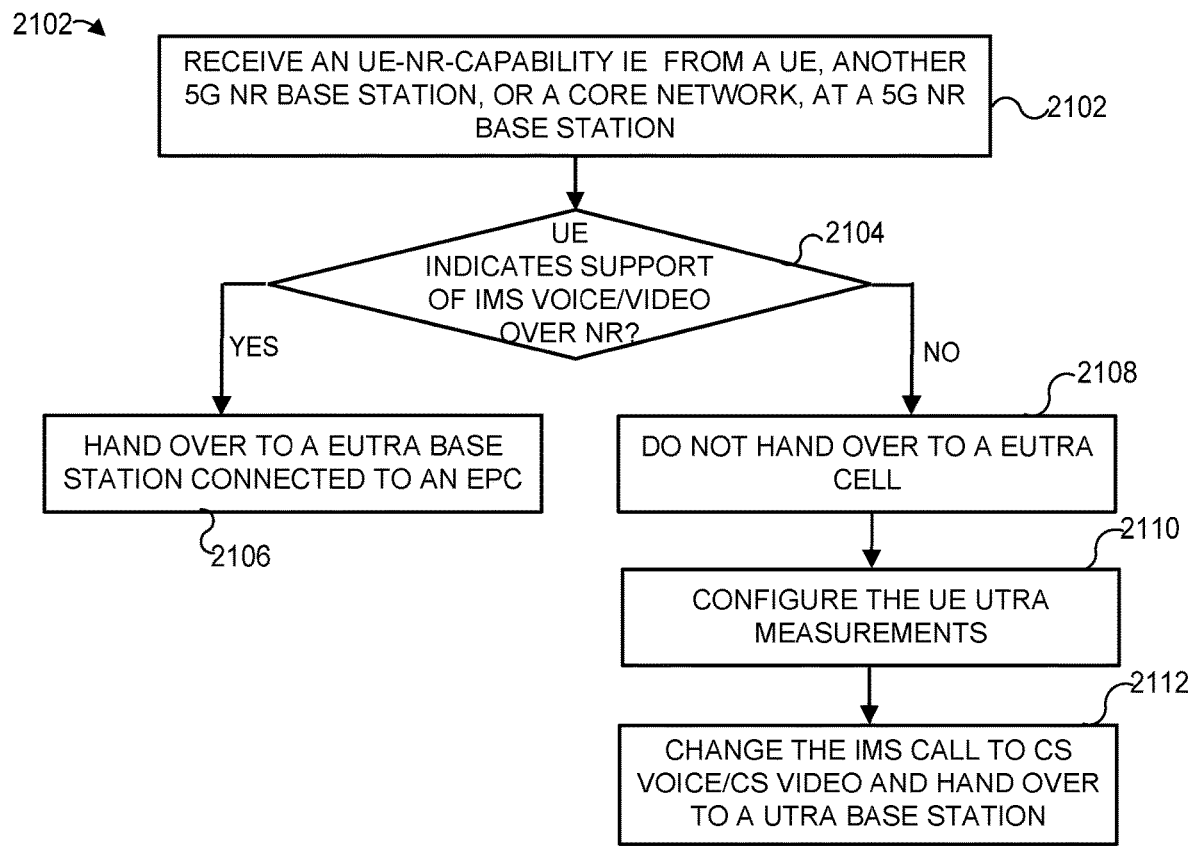

FIG. 21 is a flow diagram of an example method 2100, which can be implemented in the gNB 106 to obtaining NR capability indicating IMS video over NR support from the UE 102 and, in accordance with the obtained capability, hand over the UE 102 to the eNB 104 or change the type of the call. The method 2100 begins at block 2102, where the gNB 106 receives UE-NR-Capability from the UE 102 (e.g., message 704 of FIG. 7), another 5G NR station, or the 5GC 114 (e.g., message 802 of FIG. 8). The gNB 106 determines, at block 2104, whether the UE 102 has indicated support of IMS voice and/or IMS video over NR (e.g., procedure 740 of FIG. 7 or procedure 840 of FIG. 8). In this implementation, the gNB 106 relies on the indication of support of IMS voice and/or IMS video over NR to infer support (or lack of support) of IMS voice over EUTRA and/or IMS video over EUTRA.

If the UE 102 has indicated support of IMS voice and/or IMS video over NR, the eNB 104 determines that the UE 102 also supports IMS voice and/or IMS video over EUTRA. When a EUTRA base station, such as the eNB 104, provides preferable signals relative to the gNB 106, the gNB 106 hands over the eNB 104 at block 2106 (e.g., procedure 742 and message 750 of FIG. 7 or procedure 842 and message 850 of FIG. 8). Otherwise, the eNB 104 can execute the functions of blocks 2108-2112, which are similar to blocks 1808-1812 discussed above with reference to FIG. 18.

Figure 22:
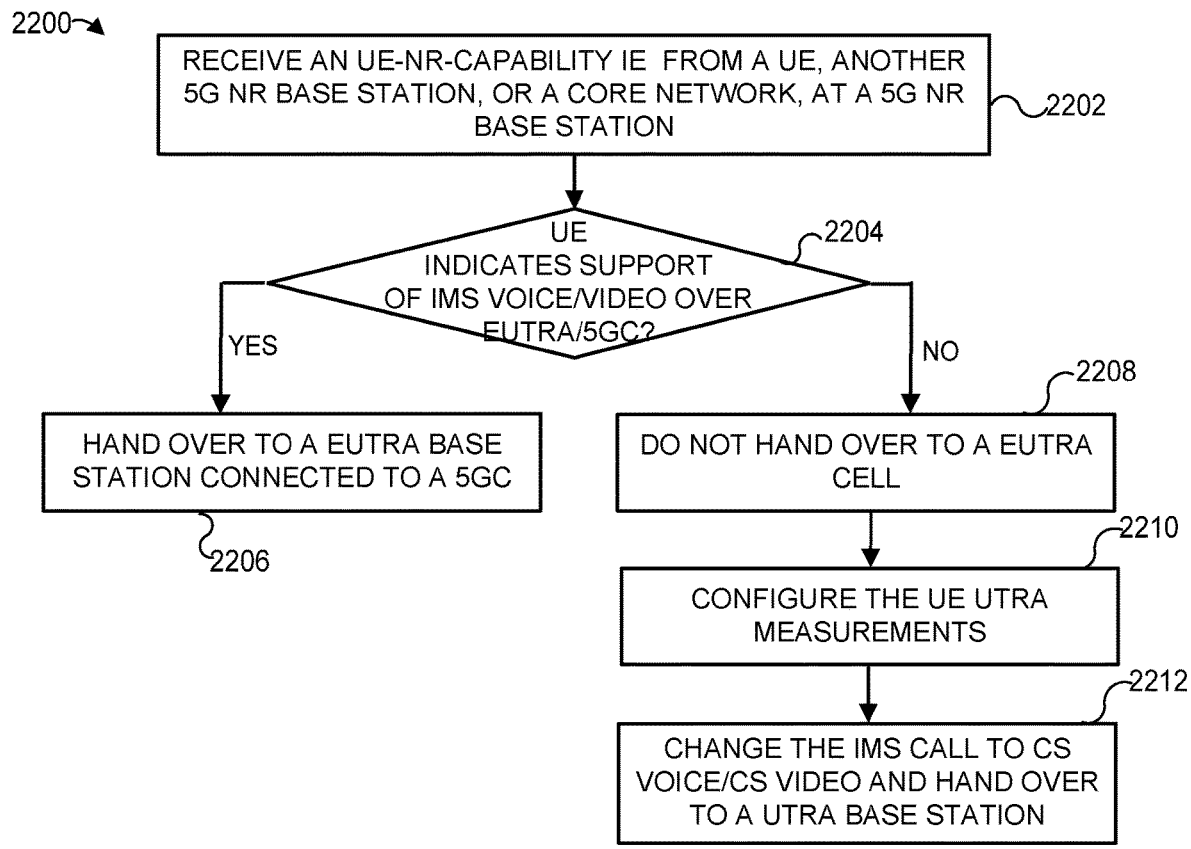
FIG. 22 is a flow diagram of an example method in the 5G NR base station for obtaining NR capability indicating support of IMS video over EUTRA/5GC from the user device and, in accordance with the obtained capability, handing over the user device to the EUTRA base station or changing the type of the call.

FIG. 22 illustrates an example method 2200 in the gNB 106 for obtaining NR capability indicating support of IMS video over EUTRA/5GC from the UE 102 and, in accordance with the obtained capability, handing over the UE 102 to the eNB 104 or changing the type of the call. The method 2200 begins at block 2202, where the gNB 106 receives UE-NR-Capability from the UE 102, another 5G NR station, or the 5GC 114. The gNB 106 determines, at block 2104, whether the UE 102 has indicated support of IMS voice and/or IMS video over EUTRA/5GC. If the UE 102 has indicated support of IMS voice and/or IMS video over EUTRA/5GC, the eNB 104 can hand over the UE 102 to the eNB 104 at block 2206. Otherwise, the eNB 104 can execute the functions of blocks 2208-2212, which are similar to blocks 1808-1812 discussed above with reference to FIG. 18.

Figure 23:
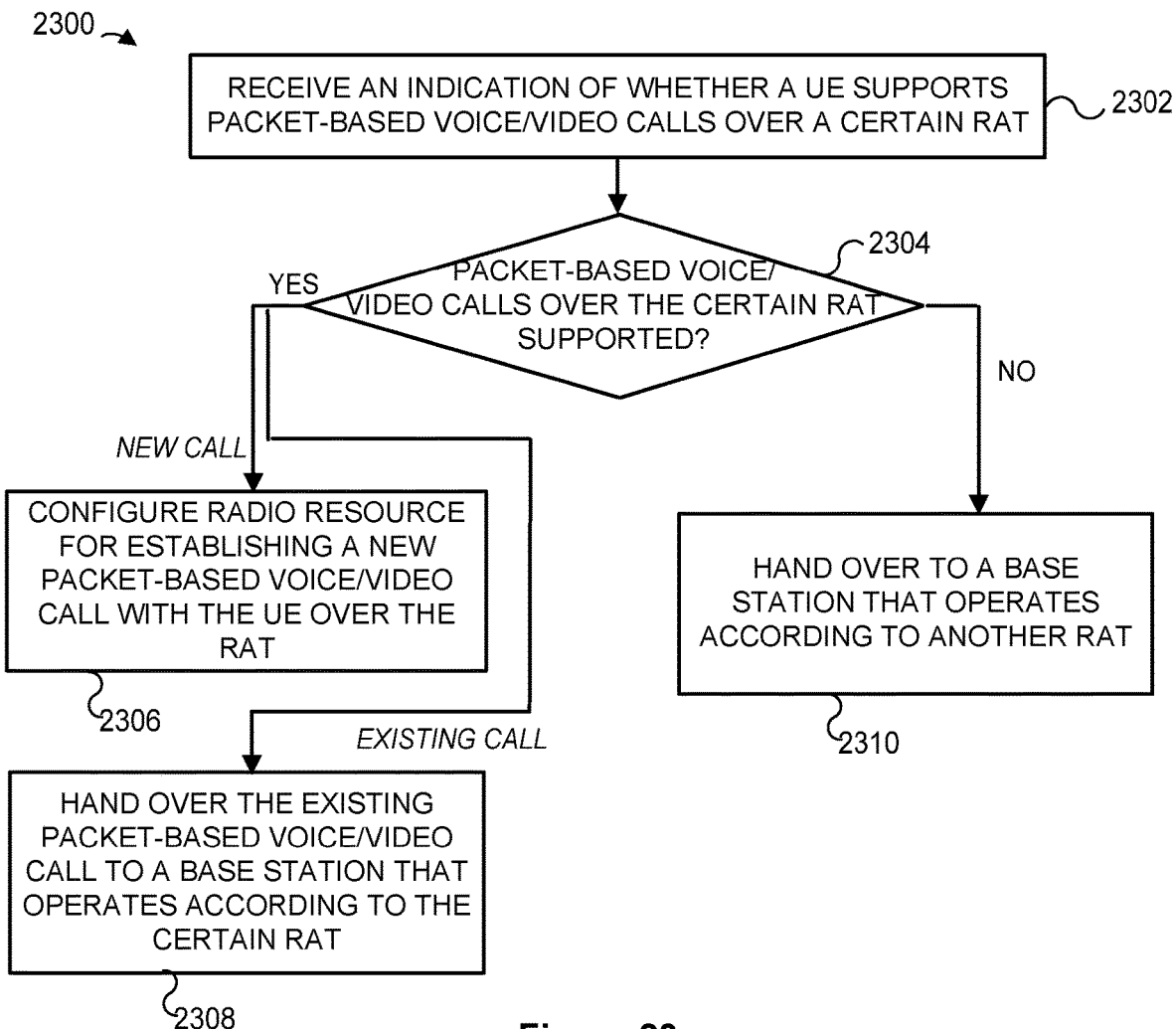
FIGS. 23-25 illustrate several example methods that can be implemented in any suitable user device or a suitable base station, in particular.
Figure 24:
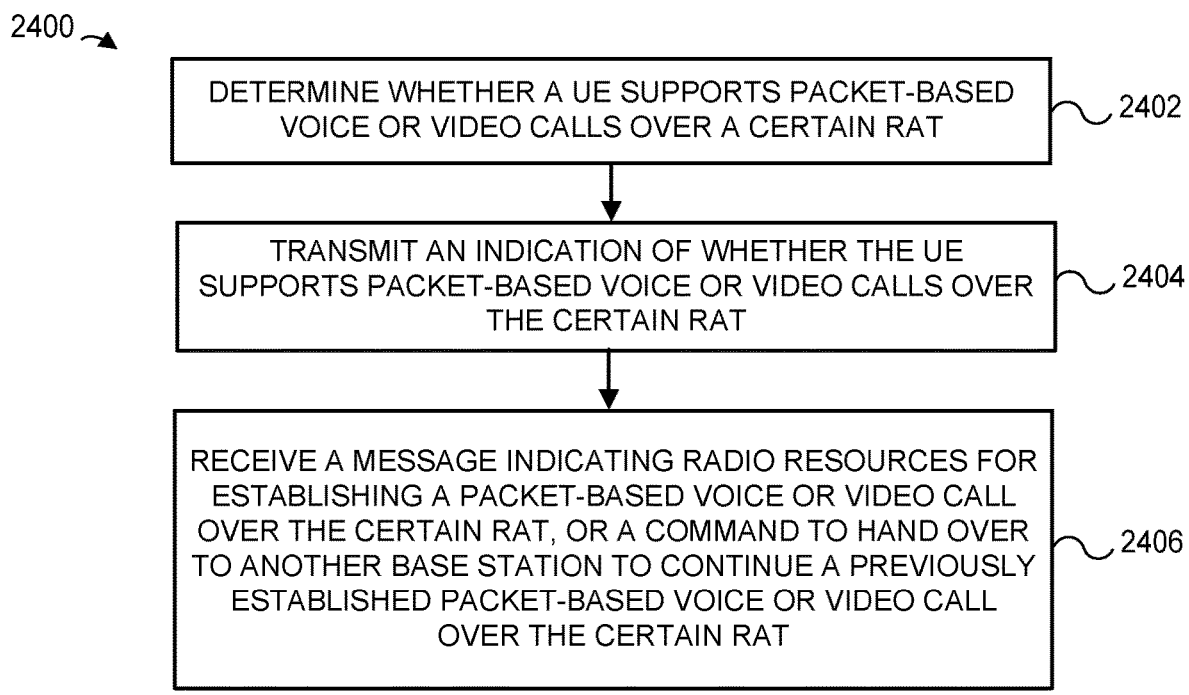
Figure 25:
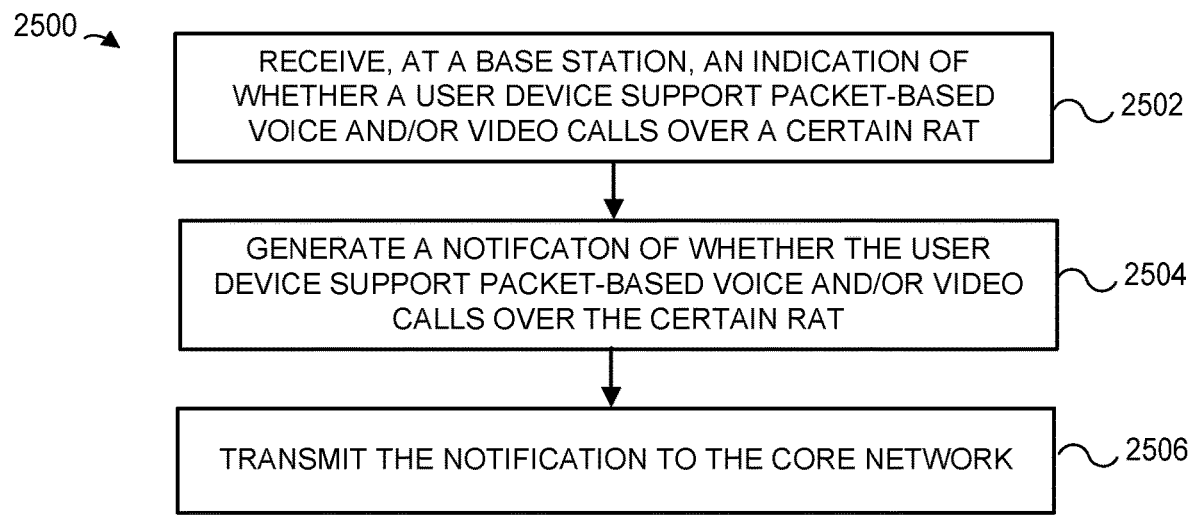

For further clarity, FIGS. 23-25 illustrate several example methods that can be implemented in any suitable user device or a suitable base station.

Referring to FIG. 23, a method 2300 can be implemented in a base station, such as the eNB 104, the gNB 106, or another suitable base station. The method 2300 can be implemented in software, firmware, hardware, or any suitable combination thereof.

The method 2300 begins at block 2302, where the base station receives an indication of whether a user device, or a UE, supports packet-based voice and or video calls (e.g., block 1602 of FIG. 16, block 1802 of FIG. 18, block 2202 of FIG. 22). The base station can receive the indication at block 2302 from the UE, the core network, or another base station. As discussed above, the base station in some implementations can query the UE regarding a certain RAT (e.g., NR) or query the CN regarding a certain UE and in response receive an indication of whether the UE supports packet-based voice calls over this RAT, and whether the UE supports packet-based voice calls over this RAT. In various implementations, the UE can indicate support or lack of support explicitly by including or omitting a field corresponding to the type of call and the type of RAT. For example, in response to a query regarding NR capabilities, the UE can include an NR RRC field to indicate support of IMS voice over NR and omit another NR RRC field to indicate lack of support of IMS video over NR.

Other example formats of indicating support of a feature, which the base station can support at block 2302, include indicating support of packet-based voice and packet-based video over a RAT using a single, shared field (and accordingly indicating lack of support of these features, or of packet-based video alone, by omitting this shared field); indicating support of packet-based voice and/or video over a certain RAT using respective fields or a shared field included in an IE pertaining to a different RAT (e.g., including respective NR RRC fields for IMS voice over NR and IMS video over NR in an UE-EUTRA-Capability IE); implicitly indicating support of packet-based voice and/or video over a certain RAT using explicit indications of support of the corresponding feature at another RAT (e.g., implicitly indicating support of IMS video over EUTRA by including a field to indicate support of IMS video over NR); etc.

At block 2304, the base station determines whether the UE supports packet-based voice or video calls (e.g., block 1604 of FIG. 16, block 1804 of FIG. 18, block 2204 of FIG. 22). When the UE is originating or receiving a new call, and when the UE has indicated support of the corresponding feature, the flow proceeds to block 2306. The base station at block 2306 configures radio resources for a new call over the RAT according to which the base station operates (e.g., block 1606 of FIG. 16). As discussed above, configuring radio resources can include configuring a DRB for voice and another DRB for video, for example.

When there is an existing call, the base station can hand over the packet-based call at block 2308 to a base station that operates according to the RAT which the UE supports, according to the indication the UE provided a block 2302 (e.g., block 1806 of FIG. 18 or block 2206 of FIG. 22). For example, a EUTRA base station can hand over the call to a 5G NR base station, or a 5G NR base station can hand over the call to a EUTRA base station.

When the base station determines that the UE does not support packet-based voice or video calls over a certain RAT, the base station can hand over the call to another RAT, such as a less advanced RAT, at block 2310. For example, a EUTRA base station can hand over a UE to a UTRA base station (when the UE has indicated support of UTRA) when the UE does not support IMS voice over NR or IMS video over NR (e.g., blocks 1808-1812 of FIG. 18, blocks 2008-2012 of FIG. 20, or blocks 2108-2112 of FIG. 21).

FIG. 24 illustrates a flow diagram of an example method 2400 that can be implemented in a user device. At block 2402, the UE determines whether the UE supports packet-based voice or video calls over a certain RAT. As discussed above, a UE in various implementations can support IMS voice over NR, IMS video over NR, IMS voice over EUTRA, IMS video over EUTRA, etc. (see, e.g., blocks 1502-1506 of FIG. 15, 1702-1706 of FIG. 17, blocks 1902-1908 of FIG. 19) Further, the UE in various implementations can support handovers of certain types, such as handovers between EUTRA and NR cells. In some implementations, the UE executes block 2402 in response to a query from a base station.

At block 2404, the UE transmits an indication of whether the UE supports packet-based calls of certain types to a base station (e.g., block 1508 of FIG. 15, block 1708 of FIG. 17, or block 1908 of FIG. 19). In various implementations, the UE can transmit information pertaining to the same RAT to which the query from the base station pertained (e.g., an indication of support of IMS video over NR when the base station queries the UE regarding its NR capability), or a different RAT (e.g., an indication of support of IMS video over NR when the base station queries the UE regarding its EUTRA capability). Further, the indication of support of a certain feature can be explicit (e.g., an NR RRC field to indicate support of IMS video over NR) or implicit (e.g., a NR RRC field indicating support of IMS video over NR also indicating support of IMS video over EUTRA). Still further, an indication can include a separate field for each feature (e.g., separate NR RRC fields for IMS voice and IMS video over NR) or a shared field (e.g., a single field indicating support of IMS voice and IMS video over NR).

At block 2406, the UE receives a message specifying radio resources (e.g., DRBs) for establishing a new packet-based voice or video call or, in another case, a command to hand over to another base station to continue a previously established packet-based voice or video call (e.g., blocks 1606 and 1608 of FIG. 16, block 1806 of FIG. 18, block 2006 of FIG. 20).

Finally, FIG. 25 illustrates a flow diagram of an example method 2500 in a base station for notifying a core network of whether a user device supports packet-based voice and video calls. The method 2500 begins at block 2502, where the base station receives an indication of whether a user device supports packet-based voice and/or video over a certain RAT (e.g., message 306 of FIG. 3, FIG. 504 of FIG. 5, message 904 of FIG. 9, message 1122 of FIG. 11, message 1222 of FIG. 12, message 1322 of FIG. 13, message 1422 of FIG. 14). The base station then generates an appropriate notification at block 2504 and transmits the notification to the core network at block 2506 (e.g., message 310 of FIG. 3, message 506 of FIG. 5, message 906 of FIG. 9, message 1124 of FIG. 11, message 1224 of FIG. 12, message 1324 of FIG. 13, message 1424 of FIG. 14). As discussed above, the base station can receive an IE encoded in a particular manner (e.g., NR RRC ASN.1, EUTRA RRC ASN.1), and in some implementations the base station forwards this IE to the core network, where a decoder processes the IE and extracts the needed information. In another implementations, the base station can convert the indications to another suitable protocol and transmit the indication to the core network.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for support packet-based voice and video calls through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

The following list of aspects reflects a variety of the embodiments explicitly contemplated by the present disclosure.

Aspect 1. A method in a first base station for supporting packet-based calls includes receiving, by processing hardware at the first base station, an indication of whether a user device supports packet-based video over a certain RAT;

when the processing hardware at the first base station determines, based on the received indication, that the user device supports packet-based video over the certain RAT: (i) configuring, by the processing hardware at the first base station, radio resources for establishing a new packet-based video call with the user device over the certain RAT, or (ii) handing over, by the processing hardware at the first base station, an existing packet-based video call, established between the first base station and the user device, to a second base station that operates according to the certain RAT.

Aspect 2. The method of aspect 1, where receiving the indication includes receiving an information element with a first field indicating whether the user device supports packet-based voice calls over the certain RAT and a second field indicating whether the user device supports packet-based video calls over the certain RAT.

Aspect 3. The method of aspect 1, where receiving the indication includes receiving an information element with a field that indicates support of both packet-based voice calls and packet-based video calls over the certain RAT.

Aspect 4. The method of any of the preceding aspects, where receiving the indication includes receiving at least one of (i) a first field indicating whether the user device supports packet-based video calls over the certain RAT for a first core network (CN) type and (ii) a second field indicating whether the user device supports packet-based video calls over the certain RAT for a second CN type.

Aspect 5. The method of any of the preceding aspects, where receiving includes receiving the indication at the first base station from the user device.

Aspect 6. The method of aspect 5, further including transmitting the indication by the first base station to a core network to which the first base station is connected.

Aspect 7. The method of any of aspects 1-4, where receiving the indication includes receiving the indication at the first base station from a core network to which the first base station is connected.

Aspect 8. The method of any of aspects 1-4, where receiving the indication includes receiving the indication at the first base station from another base station.

Aspect 9. The method of any of the preceding aspects, further including transmitting, by the first base station to the user device, a query regarding radio capabilities of the user device for the certain RAT, and where receiving the indication from the user device is in response to the transmitted query.

Aspect 10. The of any of aspects 1-8, where the certain RAT is a first RAT supported by the first base station, the method further including: transmitting, by the first base station to the user device, a query regarding radio capabilities of the user device for a second RAT, and wherein receiving the indication from the user device is in response to the transmitted query.

Aspect 11. The method of any of the preceding aspects, further including, when the processing hardware at the first base station determines that the first base station supports packet-based video over the certain RAT: causing the user device to perform a measurement related to the certain RAT, and receiving a measurement report corresponding to the performed measurement, where handing over the existing packet-based video call includes determining to select the second base station based on the received measurement report.

Aspect 12. The method of any of the preceding claims, where the certain RAT is a less advanced RAT, and wherein handing over the existing packet-based video call includes handing over the existing packet-based video call from a more advanced RAT.

Aspect 13. The method of any of aspects 1-11, where the certain RAT is a first RAT, and where handing over the existing packet-based video call includes handing over the existing packet-based video call from a second RAT, where the second RAT is less advanced than the first RAT.

Aspect 14. The method of any of the preceding aspects, where the certain RAT is different from a RAT of the first base station.

Aspect 15. The method of aspect 1, further including, when the processing hardware at the first base station determines that the first base station does not support packet-based video over the certain RAT: redirecting the user device to another base station that operates according to the certain RAT, or handing over the existing packet-based video call to a second base station that operates according to the certain RAT.

Aspect 16. A base station including processing hardware is configured to implement a method of any of aspects 1-15.

Aspect 17. A method in a user device for establishing video calls includes transmitting, by processing hardware of the user device to a first base station, an indication of whether the user device supports packet-based video over a certain RAT; and receiving, by the processing hardware, one of (i) a radio resource configuration message indicating resources for establishing a new video call over the certain RAT or (ii) a command to hand over an existing packet-based video call, established between the first base station and user device, to a second base station that operates according to the certain RAT.

Aspect 18. The method of aspect 17, further including receiving, by the processing hardware from the first base station, a query regarding radio capabilities of the user device, where transmitting the indication is in response to the received query.

Aspect 19. The method of aspect 18, where the query is for radio capabilities of the user device for the certain RAT.

Aspect 20. The method of aspect 18, where the query is for radio capabilities of the user device for a RAT different from the certain RAT.

Aspect 21. The method of any of aspects 1-20, where transmitting the indication includes transmitting the indication over a first RAT that is different from the certain RAT Aspect 22. The method of any of aspects 17-21, where transmitting the indication includes transmitting the indication during a registration procedure.

Aspect 23. The method of any of aspects 17-22, where transmitting the indication includes: transmitting an information element with a first field indicating whether the user device supports packet-based voice calls over the certain RAT and a second field indicating whether the user device supports packet-based video calls over the certain RAT.

Aspect 24. The method of any of aspects 17-23, where transmitting the indication comprises transmitting an information element with a field that indicates support of both packet-based voice calls over the certain RAT and packet-based video calls over the certain RAT.

Aspect 25. The method of any of aspects 17-24, where transmitting the indication includes: transmitting at least one of (i) a first field indicating whether the user device supports packet-based video calls over the certain RAT for a first core network (CN) type and (ii) a second field indicating whether the user device supports packet-based video calls over the certain RAT for a second CN type.

Aspect 26. A method in a first base station for supporting packet-based calls includes: receiving, by processing hardware at the first base station, an indication of whether a user device supports packet-based video calls over a certain radio access technology (RAT); generating, by the processing hardware based on the received indication, a notification of whether the user device supports packet-based video calls over the certain RAT; and transmitting, by the processing hardware, the notification to a core network to which the base station is connected.

Aspect 27. The method of aspect 26, where receiving the indication includes: receiving an information element with a first field indicating whether the user device supports packet-based voice calls over the certain RAT and a second field indicating whether the user device supports packet-based video calls over the certain RAT.

Aspect 28. The method of aspect 26, where receiving the indication includes: receiving an information element with a field that indicates support of both packet-based voice calls and voice-based voice calls over the certain RAT.

Aspect 29. The method any of aspects 26-28, where receiving the indication includes: receiving at least one of (i) a first field indicating whether the user device supports packet-based video calls over the certain RAT for a first core network (CN) type and (ii) a second field indicating whether the user device supports packet-based video calls over the certain RAT for a second CN type.

Aspect 30. The method of any of aspects 26-29, further including: transmitting, by the first base station to the user device, a query regarding radio capabilities of the user device for a first RAT (of the first BS), and where receiving the indication from the user device is in response to the transmitted query.

What is claimed is:

1. A method in a first base station for supporting packet-based calls, the method comprising:
   receiving, by the first base station, an indication of whether a user device supports packet-based video over a first Radio Access Technology (RAT);
   when the the first base station determines, based on the received indication, that the user device supports packet-based video over the first RAT:
      configuring, by the first base station, radio resources for establishing a new packet-based video call with the user device over the first RAT, or
      handing over, by at the first base station operating according to a second RAT, an existing packet-based video call, established between the first base station and the user device, to a second base station that operates according to the first RAT.

2. The method of claim 1, wherein receiving the indication comprises:
   receiving an information element with a first field indicating whether the user device supports packet-based voice calls over the first RAT and a second field indicating whether the user device supports packet-based video calls over the first RAT.

3. The method of claim 1, wherein receiving the indication comprises:
   receiving an information element with a field that indicates support of both packet-based voice calls and packet-based video calls over the first RAT.

4. The method of claim 1, further comprising:
   transmitting, by the first base station to the user device, a query regarding radio capabilities of the user device for the first RAT, and wherein receiving the indication from the user device is in response to the transmitted query.

5. The method of claim 1, wherein the first RAT is a first RAT supported by the first base station, the method further comprising:
   transmitting, by the first base station to the user device, a query regarding radio capabilities of the user device for the second RAT, and wherein receiving the indication from the user device is in response to the transmitted query.

6. The method of claim 1, wherein handing over the existing packet-based video call includes handing over the existing packet-based video call from a more advanced RAT to a less advanced RAT.

7. The method of 1, further comprising:
   when the first base station does not support packet-based video over the first RAT:
      redirecting the user device to another base station that operates according to the first RAT, or
      handing over the existing packet-based video call to a second base station that operates according to the first RAT.

8. A method in a user device for establishing video calls, the method comprising:
   transmitting, by the user device to a first base station, an indication of whether the user device supports packet-based video over a first Radio Access Technology (RAT); and
   receiving one of (i) a radio resource configuration message indicating resources for establishing a new video call over the first RAT or (ii) a command to hand over an existing packet-based video call, established between the first base operating according to a second RAT station and user device, to a second base station that operates according to the first RAT.

9. The method of claim 8, further comprising:
   receiving, by the user device from the first base station, a query regarding radio capabilities of the user device,
   wherein transmitting the indication is in response to the received query.

10. The method of claim 9, wherein the query is for radio capabilities of the user device for the second RAT different from the first RAT.

11. The method of claim 8, wherein transmitting the indication includes transmitting the indication over the second RAT that is different from the first RAT.

12. The method of claim 8, wherein transmitting the indication comprises:
   transmitting an information element with a first field indicating whether the user device supports packet-based voice calls over the first RAT and a second field indicating whether the user device supports packet-based video calls over the first RAT.

13. The method of claim 8, wherein transmitting the indication comprises transmitting an information element with a field that indicates support of both packet-based voice calls over the first RAT and packet-based video calls over the first RAT.

14. The method of claim 8, wherein transmitting the indication comprises:
   transmitting at least one of (i) a first field indicating whether the user device supports packet-based video calls over the first RAT for a first core network (CN) type and (ii) a second field indicating whether the user device supports packet-based video calls over the first RAT for a second CN type.

15. A user device configured to:
  transmit, to a first base station, an indication of whether the user device supports packet-based video over a first Radio Access Technology (RAT); and
  receive one of (i) a radio resource configuration message indicating resources for establishing a new video call over the first RAT or (ii) a command to hand over an existing packet-based video call, established between the first base station operating according to a second RAT and the user device, to a second base station that operates according to the first RAT.

16. The user device of claim 15, wherein the device is further configured to:
  receive, from the first base station, a query regarding radio capabilities of the user device,
  wherein transmitting the indication is in response to the received query.

17. The user device of claim 16, wherein the query is for radio capabilities of the user device for the second RAT different from the first RAT.

18. The user device of claim 15, wherein transmitting the indication includes transmitting the indication over a first RAT that is different from the first RAT.

* * * * *